US012493251B2

(12) United States Patent
Uematsu et al.

(10) Patent No.: US 12,493,251 B2
(45) Date of Patent: Dec. 9, 2025

(54) ELECTROPHOTOGRAPHIC MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Atsushi Uematsu, Shizuoka (JP); Satoru Nishioka, Shizuoka (JP); Hiroaki Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/891,153

(22) Filed: Sep. 20, 2024

(65) Prior Publication Data

US 2025/0102946 A1 Mar. 27, 2025

(30) Foreign Application Priority Data

Sep. 27, 2023 (JP) ................................ 2023-166398

(51) Int. Cl.

*G03G 15/02* (2006.01)
*G03G 5/05* (2006.01)
*G03G 21/18* (2006.01)

(52) U.S. Cl.

CPC ....... *G03G 15/0233* (2013.01); *G03G 5/0553* (2013.01); *G03G 21/1839* (2013.01)

(58) Field of Classification Search

CPC ............. G03G 15/0233; G03G 5/0553; G03G 21/1839

See application file for complete search history.

(56) References Cited

U.S. PATENT DOCUMENTS

| | | | |
|---|---|---|---|
| 8,440,307 | B2 | 5/2013 | Nose et al. |
| 8,481,167 | B2 | 7/2013 | Watanabe et al. |
| 8,491,994 | B2 | 7/2013 | Harada et al. |
| 8,501,312 | B2 | 8/2013 | Watanabe et al. |
| 8,538,298 | B2 | 9/2013 | Harada et al. |
| 8,622,881 | B1 | 1/2014 | Harada et al. |

(Continued)

FOREIGN PATENT DOCUMENTS

| | | | |
|---|---|---|---|
| JP | 2020-166209 | A | 10/2020 |
| JP | 2021-67946 | A | 4/2021 |

OTHER PUBLICATIONS

U.S. Appl. No. 18/891,144, Satoru Nishioka, filed Sep. 20, 2024.

*Primary Examiner* — Joseph S Wong
(74) *Attorney, Agent, or Firm* — VENABLE LLP

(57) ABSTRACT

Provided is an electrophotographic member comprising: a substrate having a conductive surface, an elastic layer, and a surface layer, in which an impedance of the electrophotographic member is in a range of $1.0\times10^3$ to $1.0\times10^8\Omega$, the elastic layer comprises a first phase comprising at least a first rubber, and a second phase comprising a second rubber and conductive particles, a thickness of the elastic layer is 10 μm or more, the elastic layer has a matrix-domain structure in which domains composed of the second phase are dispersed in a matrix composed of the first phase in a region of 5 μm or more in a depth direction from an interface between the elastic layer and the surface layer, and the amount of the second phase in the elastic layer is greater near the surface and less in the internal region.

14 Claims, 3 Drawing Sheets

(56) References Cited

U.S. PATENT DOCUMENTS

| | | | |
|---|---|---|---|
| 8,628,854 B2 | 1/2014 | Yamauchi et al. | |
| 8,668,987 B2 | 3/2014 | Yamauchi et al. | |
| 8,685,601 B2 | 4/2014 | Nose et al. | |
| 8,715,830 B2 | 5/2014 | Yamada et al. | |
| 8,750,762 B2 | 6/2014 | Harada et al. | |
| 8,771,818 B2 | 7/2014 | Nishioka et al. | |
| 8,852,743 B2 | 10/2014 | Kikuchi et al. | |
| 8,923,732 B2 | 12/2014 | Harada et al. | |
| 8,991,053 B2 | 3/2015 | Watanabe et al. | |
| 9,075,333 B2 | 7/2015 | Uematsu et al. | |
| 9,128,403 B2 | 9/2015 | Yamauchi et al. | |
| 9,146,482 B2 | 9/2015 | Watanabe et al. | |
| 9,274,442 B2 | 3/2016 | Sato et al. | |
| 9,360,789 B1 | 6/2016 | Masu et al. | |
| 9,360,833 B2 | 6/2016 | Terada et al. | |
| 9,372,429 B2 | 6/2016 | Watanabe et al. | |
| 9,411,307 B2 | 8/2016 | Matsuda et al. | |
| 9,442,408 B2 | 9/2016 | Yamauchi et al. | |
| 9,442,451 B2 | 9/2016 | Yamauchi et al. | |
| 9,448,502 B2 | 9/2016 | Taniguchi et al. | |
| 9,541,854 B2 | 1/2017 | Kikuchi et al. | |
| 9,547,250 B2 | 1/2017 | Kikuchi et al. | |
| 9,551,949 B2 | 1/2017 | Yamauchi et al. | |
| 9,581,931 B2 | 2/2017 | Yamada et al. | |
| 9,599,913 B2 | 3/2017 | Nishioka et al. | |
| 9,599,914 B2 | 3/2017 | Uematsu et al. | |
| 9,639,009 B2 | 5/2017 | Yamaguchi et al. | |
| 9,651,888 B2 | 5/2017 | Muranaka et al. | |
| 9,665,028 B2 | 5/2017 | Arimura et al. | |
| 9,740,133 B2 | 8/2017 | Yamauchi et al. | |
| 9,811,009 B2 | 11/2017 | Yamada et al. | |
| 9,897,931 B2 | 2/2018 | Nishioka et al. | |
| 9,904,199 B2 | 2/2018 | Terada et al. | |
| 9,910,379 B2 | 3/2018 | Furukawa et al. | |
| 9,958,802 B2 | 5/2018 | Kikuchi et al. | |
| 9,964,914 B2 | 5/2018 | Arimura et al. | |
| 9,977,353 B2 | 5/2018 | Nishioka et al. | |
| 10,018,927 B2 | 7/2018 | Yamada et al. | |
| 10,018,934 B2 | 7/2018 | Yamada et al. | |
| 10,025,216 B2 | 7/2018 | Uematsu et al. | |
| 10,108,129 B2 | 10/2018 | Yamaguchi et al. | |
| 10,146,149 B2 | 12/2018 | Watanabe et al. | |
| 10,248,042 B2 | 4/2019 | Uematsu et al. | |
| 10,280,148 B2 | 5/2019 | Nishioka et al. | |
| 10,317,811 B2 | 6/2019 | Tomomizu et al. | |
| 10,416,588 B2 | 9/2019 | Masu et al. | |
| 10,558,136 B2 | 2/2020 | Furukawa et al. | |
| 10,649,350 B2 | 5/2020 | Yamaguchi et al. | |
| 10,678,154 B2 | 6/2020 | Takashima et al. | |
| 10,678,158 B2 | 6/2020 | Kikuchi et al. | |
| 10,845,724 B2 | 11/2020 | Kikuchi et al. | |
| 11,112,719 B2 | 9/2021 | Makisumi et al. | |
| 11,112,748 B2 | 9/2021 | Yamada et al. | |
| 11,137,716 B2 | 10/2021 | Hiyama et al. | |
| 11,169,454 B2 | 11/2021 | Nishioka et al. | |
| 11,175,602 B2 | 11/2021 | Nishioka et al. | |
| 11,307,509 B2 | 4/2022 | Hino et al. | |
| 11,340,553 B2 | 5/2022 | Watariguchi et al. | |
| 11,347,156 B2 | 5/2022 | Kurachi et al. | |
| 11,366,402 B2 | 6/2022 | Ishiduka et al. | |
| 11,385,559 B2 | 7/2022 | Kikuchi et al. | |
| 11,392,050 B2 | 7/2022 | Nishida et al. | |
| 11,397,388 B2 | 7/2022 | Nishioka et al. | |
| 11,556,073 B2 | 1/2023 | Fushimoto et al. | |
| 11,586,121 B2 | 2/2023 | Yamada et al. | |
| 11,619,890 B2 | 4/2023 | Uematsu et al. | |
| 11,640,122 B2 | 5/2023 | Kikuchi et al. | |
| 11,644,761 B2 | 5/2023 | Kodama et al. | |
| 11,675,282 B2 | 6/2023 | Yamaguchi et al. | |
| 11,835,878 B2 | 12/2023 | Kodama et al. | |
| 11,971,683 B2 | 4/2024 | Nishioka et al. | |
| 12,032,331 B2 | 7/2024 | Uematsu et al. | |
| 2021/0116827 A1* | 4/2021 | Fukudome | G03G 9/08797 |
| 2021/0116829 A1 | 4/2021 | Tomono et al. | |
| 2022/0146958 A1 | 5/2022 | Higuchi et al. | |
| 2022/0229376 A1 | 7/2022 | Segawa et al. | |
| 2022/0229379 A1 | 7/2022 | Kaneko et al. | |
| 2022/0244658 A1* | 8/2022 | Yamada | F16C 13/00 |
| 2022/0244673 A1 | 8/2022 | Takashima et al. | |
| 2023/0288826 A1 | 9/2023 | Nakazono et al. | |
| 2023/0288867 A1 | 9/2023 | Shimozawa et al. | |
| 2024/0103393 A1* | 3/2024 | Yamakoshi | G03G 21/1814 |

* cited by examiner

ELECTROPHOTOGRAPHIC MEMBER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic member, a process cartridge, and an electrophotographic image forming apparatus that can be used for electrophotography.

Description of the Related Art

An electrophotographic image forming apparatus comprises a charging member, a transfer member, and a developing member. The charging member is a member that generates a discharge between the charging member and the electrophotographic photosensitive member to charge the surface of the electrophotographic photosensitive member. The developing member is a member that controls the charge of a developer applied onto the surface thereof by triboelectric charging, provides a uniform charge amount distribution, and uniformly transfers the developer to the surface of the electrophotographic photosensitive member according to an applied electric field. The transfer member is a member that transfers the developer from the electrophotographic photosensitive member to a print medium such as paper or an intermediate transfer member, and simultaneously generates a discharge to stabilize the transferred developer.

In the electrophotographic image forming process, a latent image is drawn by charging the surface of the photosensitive member and then exposing the surface of the photosensitive member, toner is transferred to the latent image on the surface of the photosensitive member by a developing member, and the toner is transferred to a paper medium by a transfer member. At the time of transfer to the paper medium, the toner (hereinafter also referred to as "transfer residual toner") remaining on the photosensitive member without being transferred onto the paper is scraped off by a cleaning member to be removed from the surface of the photosensitive member.

However, when the cleaning member cannot completely scrape off the toner, the toner or an external additive adheres to the surface of the charging member as a soiling substance, and overdischarge occurs due to the soiling substance, and accordingly, a white spot-like image (hereinafter also referred to as a "white spot image") may be generated.

Japanese Patent Application Laid-open No. 2021-067946 discloses a charging member in which charges are uniformly applied to a soiling substance adhering to the surface of the charging member, and the soiling substance is expelled from the surface of the charging member to a surface of a photosensitive member to suppress accumulation of the soiling substance on the surface of the charging member. The charging member has a surface layer formed on an elastic layer, and the elastic layer has a matrix-domain structure in which domains comprising a second rubber and a conductive agent are dispersed in a matrix comprising a first rubber.

SUMMARY OF THE INVENTION

In recent years, an electrophotographic image forming process has further increased in speed and service life, and an electrophotographic image forming apparatus having a configuration (hereinafter also referred to as a "cleaner-less configuration") not comprising a cleaning member for removing transfer residual toner remaining on a photosensitive member has also been provided in order to downsize the apparatus. When the present inventors performed durability evaluation in a higher-speed process and in a cleaner-less configuration using the charging member of Japanese Patent Application Laid-open No. 2021-067946, at print volumes where the accumulation of soiling substances on the charging member was not previously an issue, accumulation of soiling substances became significant, and a white spot image was generated sometimes due to excessive discharge caused by the soiling substance.

At least one aspect of the present disclosure is directed to an electrophotographic member capable of forming a high-quality image over a long period of time even under a severe condition of accumulation of soiling of the electrophotographic member, i.e., further speeding up of an electrophotographic image forming process and a cleaner-less configuration. In addition, at least one aspect of the present disclosure is directed to a process cartridge that contributes to high-quality electrophotographic image formation. Furthermore, at least one aspect of the present disclosure is directed to an electrophotographic image forming apparatus capable of forming a high-quality electrophotographic image.

According to at least one aspect of the present disclosure, there is provided an electrophotographic member comprising:

- a substrate having a conductive surface;
- an elastic layer on the conductive surface of the substrate; and
- a surface layer which is in contact with a surface of the elastic layer on an opposite side to a surface that faces the substrate, wherein
- the surface layer comprises an electronic conductive agent,
- a metal film is provided on an outer surface of the surface layer of the electrophotographic member, and in an environment with a temperature of 23° C. and a relative humidity of 50%, impedance between the conductive surface of the substrate and the metal film is in a range of $1.0\times10^3$ to $1.0\times10^8\Omega$, when an AC voltage with an amplitude of 1 V and a frequency of 1.0 Hz is applied,
- the elastic layer comprises an insulating first phase comprising at least a crosslinked product of a first rubber, and a second phase comprising conductive particles and a crosslinked product of a second rubber different from the first rubber,
- a thickness of the elastic layer is at least 10 μm,
- the elastic layer has a matrix-domain structure in which domains composed of the second phase is dispersed in a matrix composed of the first phase in a region of at least 5 μm in a depth direction to the elastic layer from an interface between the elastic layer and the surface layer,
- when a region having a thickness of 1 μm from an interface between the elastic layer and the surface layer to a position of 1 μm in a depth direction to the elastic layer is defined as a region A, and a region having a thickness of 1 μm from the interface to a position of 5 to 6 μm in a depth direction to the elastic layer is defined as a region B, and
- a first surface of the elastic layer in the region A is exposed and a square first observation region having a side of 100 μm is placed on the first surface by a scanning electron microscope, the first observation region comprises at least the second phase, a ratio value (AR12/AR11) of a total area AR12 of the second phase in the first observation region relative to an area AR11 of the first observation region is more than 0.40, and when a second surface of the elastic layer in the region B is exposed and a square second observation region having a side of 100 μm is placed on the second surface by a scanning electron microscope, the matrix-domain structure is observed in the second observation region, and a ratio value (AR22/AR21) of a total area AR22 of the second phase in the second observation region relative to an area AR21 of the second observation region is 0.40 or less.

According to at least one aspect of the present disclosure, there is provided a process cartridge detachable from an electrophotographic image forming apparatus, the process cartridge comprising the above electrophotographic member.

According to at least one aspect of the present disclosure, there is provided an electrophotographic image forming apparatus, comprising the above electrophotographic member.

According to at least one aspect of the present disclosure, it is possible to provide an electrophotographic member capable of forming a high-quality image over a long period of time even under a severe condition for the accumulation of soiling on the electrophotographic member, i.e., further speeding up of an electrophotographic image forming process and a cleaner-less configuration. According to at least one aspect of the present disclosure, a process cartridge that contributes to high-quality electrophotographic image formation can be provided. Furthermore, according to at least one aspect of the present disclosure, it is possible to provide an electrophotographic image forming apparatus capable of forming a high-quality electrophotographic image.

Further features of the present invention will become apparent from the following description of exemplary embodiments with reference to the attached drawings.

DESCRIPTION OF THE EMBODIMENTS

Figure 1:
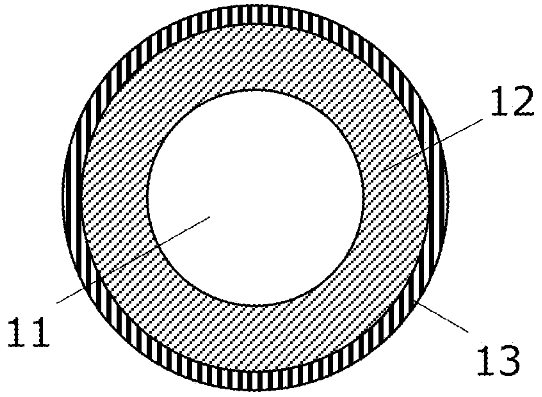
FIG. 1 is a cross-sectional view of a conductive roller.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The present inventors have studied the reason why white dots appeared on electrophotographic images in the charging member according to Japanese Patent Application Laid-open No. 2021-067946, and found that with an increased process speed and in a cleaner-less configuration, the accumulation of soiling substances such as toner and external additives on the charging member became significant at print volumes where the accumulation of soiling substances was not previously an issue.

First, a process in which soiling substances such as toner and external additives adhere to the surface of the charging member will be described. Since it is necessary for the toner and the external additive to have a certain charge such that the toner and the external additive can be appropriately transferred to the photosensitive member in the development process, the toner and the external additive often have insulating properties. For this reason, the toner and the external additive as soiling substances also have insulating properties. In a developer container, the toner and the external additive are charged with a polarity largely biased to positive or negative. On the other hand, the soiling substance of the toner or the external additive, which is not transferred to the paper or the intermediate transfer member and remains on the photosensitive drum, is affected by rubbing or the like before reaching the charging member, and thus, is charged with a constant distribution with respect to the positive and negative polarities.

On the other hand, the charging member is configured to cause a discharge with respect to the photosensitive member. Specifically, a DC voltage is applied to the charging member to generate a potential difference between the charging member and the surface of the photosensitive member. In this case, with respect to the potential difference between the charging member and the photosensitive member, it is difficult to avoid adhesion of soiling components with polarity opposite to the polarity of the charging bias to each other to the charging member side due to the electrostatic attractive force, and the soiling substances are transferred from the photosensitive member to the charging member.

Next, a white spot image generated due to abnormal discharge caused by a soiling substance will be described. A discharge phenomenon occurs between the charging member and the photosensitive member following the Paschen's law, and the surface of the photosensitive member is charged with either negative or positive charge depending on the applied voltage. Since the discharge occurs by ionization of neutral air in the electric field, charges having opposite polarity are also generated simultaneously. That is, while the photosensitive member is charged by negative or positive charges by discharge, charges having a polarity opposite to that of the charges for charging the photosensitive member are also directed to the charging member by the electric field.

In a case where the charging member is contaminated with an insulating soiling substance, the charge having the opposite polarity toward the charging member does not escape from the surface of the charging member to the substrate side but is trapped on the surface, and accordingly, the soiling substance adhering to the surface of the charging member is charged with the opposite polarity. The charge having the opposite polarity exists at a very short distance between the soiling substance charged with the opposite polarity and the peripheral region of the region to which the soiling substances are adhering. Therefore, an extremely strong electric field is generated, and due to this extremely strong electric field, abnormally excessive discharge occurs, and a white spot image is generated.

Next, the "expelling" phenomenon in which soiling substances adhering to the surface of the charging member is returned to the photosensitive member will be described.

When the soiling substance adheres to the charging member, the charge having the same polarity as that of the applied bias is gradually applied to the soiling substance from the outer surface due to the negative or positive applied bias to the charging member. When charges are sufficiently accumulated in the soiling substance, an electrostatic force acts by an electric field formed from the surface of the charging member toward the photosensitive drum, and exceeds an attachment force between the surface of the charging member and the soiling, and accordingly, the "expelling" phenomenon occurs in which the soiling is separated from the surface of the charging member and transfers to the photosensitive member side. That is, when charges are sufficiently accumulated in most of the soiling substances and the expelling phenomenon occurs efficiently, accumulation of the soiling substances can be prevented.

As described above, the charging member of Japanese Patent Application Laid-open No. 2021-067946 has a configuration of a surface layer in which an electronic conductive agent is added to an elastic layer having a matrix-domain structure. On the outer peripheral surface of the domain in the matrix-domain structure, since there is little unevenness and the domains are nearly spherical, it is difficult to create a concentration point of electron exchange between the domains. Furthermore, due to the presence of the conductive surface layer in which the electronic conductive agent is dispersed, a charge having the same polarity as the applied bias can be homogeneously applied to the soiling substance.

However, in the charging member of Japanese Patent Application Laid-open No. 2021-067946, there is a case where a region in which linking of a domain in an elastic layer and a conductive path by conductive particles in a surface layer is small is formed. In this case, the charge stagnates at the interface between the elastic layer and the surface layer, and sufficient charge cannot be applied to the soiling substance, and the soiling substance is accumulated without being expelled. This phenomenon was significant in the accelerated process. In addition, in the case of the cleaner-less configuration, there are many soiling substances that migrate to the surface of the charging member as transfer residual toner or the like. Therefore, it is not possible to apply a charge having the same polarity as that of the applied bias to all soiling substances, and some of the soiling substances that cannot be expelled to the photosensitive member remains, and accumulation of soiling substances occurs.

From the above, the present inventors have recognized that it is necessary to more efficiently perform charge exchange between the domain in the elastic layer and the conductive path by the conductive particles in the surface layer in the above configuration in order to suppress the accumulation of the soiling substances in the accelerated process and the cleaner-less configuration. Based on such recognition, the present inventors have further conducted studies, and as a result, have found that in an electrophotographic member comprising a substrate having a conductive surface, an elastic layer on the conductive surface of the substrate, and a surface layer which is in contact with a surface of the elastic layer on a side opposite to a surface facing the substrate, by satisfying all of the following requirements (A) to (D), generation of a white spot image can be suppressed over a long period of time even in a severe condition for the soiling such as a high-speed process and a cleaner-less configuration.

Requirement (A)

When a metal film is provided on the outer surface of the surface layer of the electrophotographic member, and an AC voltage with an amplitude of 1 V and a frequency of 1.0 Hz is applied between the conductive surface of the substrate and the metal film in an environment of a temperature of 23° C. and a relative humidity of 50%, the impedance is $1.0\times10^3$ to $1.0\times10^8\Omega$.

Requirement (B)

The elastic layer comprises an insulating first phase comprising at least a first rubber, and a second phase comprising a second rubber different from the first rubber and conductive particles, and the elastic layer has a thickness of 10 μm or more. A region having a thickness of 1 μm from an interface between the elastic layer and the surface layer to a position of 1 μm in the depth direction to the elastic layer is defined as a region A. When a first surface in the region A is exposed and a square first observation region having a side of 100 μm is placed on the first surface by a scanning electron microscope, the first observation region comprises at least a second phase comprising a second rubber and conductive particles. A ratio value (AR12/AR11) of the total area AR12 of the area of the second phase in the first observation region to the area AR11 of the first observation region is more than 0.40.

Requirement (C)

The elastic layer has a matrix-domain structure in which domains composed of the second phase are dispersed in a matrix composed of the first phase in a region of 5 μm or more in the depth direction from an interface between the elastic layer and the surface layer to the elastic layer. A region having a thickness of 1 μm from an interface between the elastic layer and the surface layer to a position of 5 μm to 6 μm in the depth direction to the elastic layer is defined as a region B. When the second surface in the region B is exposed and a square second observation region having a side of 100 μm is placed on the second surface by a scanning electron microscope, the matrix-domain structure is observed in the second observation region. Furthermore, a ratio value (AR22/AR21) of the total area AR22 of the area of the second phase in the second observation region to the area AR21 of the second observation region is 0.40 or less.

Requirement (D)

The surface layer comprises an electronic conductive agent.

Hereinafter, each requirement will be described in detail.

Requirement (A)

The requirement (A) represents the degree of conductivity of the electrophotographic member. The electrophotographic member showing such an impedance value can suppress an excessive increase in discharge current amount, and as a result, can prevent occurrence of potential unevenness of charging due to abnormal discharge. In addition, it is possible to suppress shortage of injected charges supplied to the soiling substance. The impedance is preferably $1.0\times10^4$ to $1.0\times10^7\Omega$.

The impedance can be controlled by the volume resistivity value of the domain and the amount of the domain in the matrix-domain structure.

The impedance according to the requirement (A) can be measured by the following method.

First, in order to eliminate the influence of the contact resistance between the electrophotographic member and the measurement electrode, a low-resistance thin film is accumulated on the outer surface of the surface layer of the electrophotographic member, the thin film is used as an electrode, and the impedance is measured with two terminals using a conductive substrate as a ground electrode.

Examples of a method for forming the thin film include a method for forming a metal film such as metal deposition, sputtering, application of a metal paste, and attachment of a metal tape. Among these, from the viewpoint of reducing the contact resistance with the electrophotographic member, a method for forming a metal film such as platinum or palladium as an electrode by deposition is preferable. In the present disclosure, a platinum metal film is used.

When a metal film is formed on the surface of the electrophotographic member, it is preferable to provide a mechanism capable of gripping the electrophotographic member in the vacuum deposition apparatus in consideration of convenience and uniformity of the thin film. In addition, it is preferable to use a vacuum deposition apparatus further provided with a rotation mechanism for the electrophotographic member having a cylindrical cross section.

For a cylindrical electrophotographic member having, for example, a cross section that is formed of a curved surface such as a circle, it is difficult to connect the metal film as the measurement electrode and the impedance measuring device, and thus it is preferable to use the following method. Specifically, after an electrode of a metal film having a width of 10 to 20 mm is formed in the longitudinal direction of the electrophotographic member, a metal sheet may be wound without a gap, and the metal sheet may be connected to a measurement electrode output from a measuring device for measurement. As a result, the electrical signal from the surface layer of the electrophotographic member can be suitably acquired by the measuring device, and impedance measurement can be performed. When the impedance is measured, the metal sheet may be a metal sheet having an electric resistance value equivalent to that of the metal portion of the connection cable of the measuring device, and for example, an aluminum foil, a metal tape, or the like can be used.

The impedance measuring device may be any device capable of measuring impedance in a frequency domain of up to $1.0\times10^7$ Hz, such as an impedance analyzer, a network analyzer, or a spectrum analyzer. Among these, it is preferable to perform measurement by an impedance analyzer from the electric resistance region of the electrophotographic member.

The impedance measurement conditions will be described. The impedance in the frequency domain of 1.0 Hz is measured using an impedance measuring device (for example, trade name "Solartron 1260", 96 W type dielectric impedance measurement system, manufactured by Solartron Metrology). The measurement is performed in an environment of a temperature of 23° C. and a relative humidity of 50%. The amplitude of the AC voltage is 1 Vpp. Five regions are equally divided into five in the longitudinal direction of the electrophotographic member, and the measurement is performed once in each region, that is, a total of five times. The average value is taken as the impedance of the electrophotographic member. A more specific procedure of the measurement will be described later.

Requirement (B)

The requirement (B) is a requirement representing a state in the vicinity of the outer surface of the elastic layer. The vicinity of the outer surface is a region having a thickness of 1 μm from the interface between the elastic layer and the surface layer to a position of 1 μm in the depth direction to the elastic layer, and this region is referred to as a region A. As will be described later in the requirement (C), the region B inside the elastic layer excluding the outer surface indicates a region having a thickness of 1 μm from the interface between the elastic layer and the surface layer to a position of 5 to 6 μm in the depth direction to the elastic layer.

In a region of 5 μm or more in the depth direction from the interface between the elastic layer comprising the region B and the surface layer to the elastic layer, the elastic layer has a matrix-domain structure in which domains composed of a second phase comprising conductive particles and a crosslinked product of a second rubber different from the first rubber are dispersed in a matrix composed of an insulating first phase comprising a crosslinked product of the first rubber. The ratio value (AR22/AR21) is 0.40 or less. On the other hand, in the region A in the vicinity of the outer surface of the elastic layer, the ratio value (AR12/AR11) is more than 0.40. The region A may not have a matrix-domain structure in which the domains of the second phase are dispersed in the matrix of the first phase described above, and may have an inverted structure in which the first phase is dispersed in the second phase.

In the matrix-domain structure, charges can be accumulated on the interface side with the matrix in the domain, and the charges accumulated in the domain promptly transfer to the surface of the electrophotographic member after the charges on the surface of the electrophotographic member are consumed by discharge. However, when the entire elastic layer has a matrix-domain structure, at the interface between the surface layer and the elastic layer, charge exchange between the matrix portion in the elastic layer and the conductive path by the electronic conductive agent in the surface layer does not work well, and the charge stagnates. After the charge on the surface of the electrophotographic member is consumed by the discharge, it becomes difficult to promptly transfer the charge to the surface of the electrophotographic member.

Therefore, it is not possible to sufficiently obtain the effect of applying a charge having the same polarity as the applied voltage to the soiling substance at the nip portion after discharging at the upstream of the nip portion with respect to the contact portion (hereinafter also referred to as a "nip portion") between the electrophotographic member and the photosensitive member. As a result, the ability to expel soiling substances to the photosensitive member decreases, and the soiling substances are accumulated on the surface of the electrophotographic member. This phenomenon is likely to become apparent in an accelerated process in which the time from discharge upstream to passing through the nip is short, or in a case where there are many soiling substances that need to be charged.

In order to suppress such stagnation of charge transfer at the elastic layer/surface layer interface, a configuration in which the amount of the second phase which is a domain at the elastic layer/surface layer interface is large is preferable. However, although details will be described later in the requirement (C), increasing the amount of domains in the entire region in the elastic layer causes the domains to be linked in a wide range, and charges cannot be accumulated in the domains, and accordingly, the charge application performance to the soiling substance rather deteriorates.

Therefore, it is important that the amount of the second phase is large only in the region A in the vicinity of the outer surface of the elastic layer that forms the interface with the surface layer, and the amount of the second phase in the region B that is the other elastic layer region is an amount that does not connect the second phases to each other and can form the domains.

With the above configuration, charge exchange can be efficiently performed from the second phase in the elastic layer to the conductive path by the electronic conductive agent in the surface layer. As a result, after the charge on the surface of the electrophotographic member is consumed by the discharge at the upstream portion of the nip, the charge can be promptly transferred to the surface of the electrophotographic member in the time until the electrophotographic member reaches the nip portion, and even in an accelerated main body in which the above-described time is short, sufficient charge can be applied to the soiling substance at the nip portion.

For the ratio of the second phase in the elastic layer on the outer surface of the elastic layer, a plane parallel to the longitudinal direction is cut out from the surface layer side of the electrophotographic member, and the surface of the elastic layer in the region A is observed with a scanning electron microscope to calculate the area of the second phase. Specifically, when the total area of the first phase and the second phase, that is, the area of the entire first observation region is defined by AR11, and the area of the domain is defined by AR12, AR12/AR11 needs to be more than 0.40. AR12/AR11 is preferably 0.50 to 0.75 and more preferably 0.60 to 0.75.

The thickness of the elastic layer is 10 μm or more. The thickness of the elastic layer may be 10 μm or more, and the upper limit is not particularly limited. The thickness of the elastic layer is preferably 1.0 to 2.0 mm.

Requirement (C)

The requirement (C) is a requirement representing the state of the elastic layer in a region excluding the vicinity of the outer surface of the elastic layer in the elastic layer. Specifically, this refers to a region having a depth of 5 μm or more in the depth direction of the elastic layer from the elastic layer/surface layer interface. Then, the presence state of the second phase is typically observed in a region (region B) having a thickness of 1 μm from the elastic layer/surface layer interface to a position of 5 to 6 μm in the depth direction of the elastic layer.

A region of 5 μm or more in the depth direction from the interface between the elastic layer and the surface layer comprising the region B to the elastic layer has a matrix-domain structure in which domains are dispersed in a matrix. In the region B, the ratio (domain ratio) of the second phase is 40% or less, that is, AR22/AR21 is 0.40 or less.

When AR22/AR21 is 0.40 or more, most domains may be linked to each other. Since the domains are linked to each other, a phenomenon of charges transfer between the domains becomes dominant rather than a phenomenon in which charges are accumulated on the matrix interface side in the domains, and excessive discharge may occur upstream of the nip. Since the charges cannot be accumulated on the matrix interface side in the domain, the charges on the surface of the electrophotographic member cannot be promptly resupplied to the surface of the electrophotographic member after the charges on the surface of the electrophotographic member are greatly consumed by excessive discharge, and thus sufficient charge application to the soiling substance cannot be performed at the nip portion. As a result, the soiling substance cannot be sufficiently expelled to the photosensitive member, and accumulation of the soiling substances becomes apparent. In addition, white spots are likely to be generated.

For the ratio of the domains in the region B, a plane parallel to the longitudinal direction is cut out from the surface layer side of the electrophotographic member, and in the region B, any cut out surface is observed with a scanning electron microscope to calculate the areas of the matrix portion and the domain portion. Specifically, when the total area of the matrix portion and the domain portion, that is, the area of the entire second observation region is defined by AR21, and the area of the second phase capable of forming the domain is defined by AR22, AR22/AR21 is 0.40 or less. AR22/AR21 is preferably 0.15 to 0.40 and more preferably 0.20 to 0.40.

In addition, it is preferable that there are few protruded portions and depressed portions on the outer peripheral surface of the domain dispersed in the matrix in the region B. When there is little unevenness on the outer peripheral surface of the domain, low density hardly occurs in charge exchange between the domains, and charge supply to the surface of the electrophotographic member becomes more uniform. This is because when the charge exchange is concentrated on the protruded portion and a location where the charge exchange is concentrated is formed at a part, a location where the charge exchange is not sufficient is also generated at the same time. As a result, charges can be uniformly applied to the soiling substance, and the accumulation of the soiling substance is more easily suppressed. In addition, white spots are more easily suppressed.

Specifically, it can be determined as follows that the number of protruded portions and depressed portions on the outer peripheral surface of the domain is small. The second surface in the region B is exposed, an observation region of 15 μm square is placed on the second surface in the region B by a scanning electron microscope, the perimeter of the domain is defined as A, and the envelope perimeter of the domain is defined as B. At this time, the number ratio of domains having an A/B value of 1.00 to 1.10 is preferably 80 number % or more, and more preferably 88 to 98 number %.

The arithmetic mean value of A/B is preferably 1.00 to 1.10, and more preferably 1.00 to 1.07.

In addition, when the second surface in the region B is exposed, an observation region of 15 μm square is placed on the second surface in the region B by a scanning electron microscope, and the domain is observed, the number average value of the circle-equivalent diameters of the domains is preferably 0.2 to 3.0 μm and more preferably 0.4 to 2.0 μm.

Requirement (D)

The requirement (D) is a requirement of the surface layer. In a case where there is no surface layer, the contact area between the toner and the elastic layer is minute, and in a case where the contact part is a matrix portion of the elastic layer, there is a case where the charge applied to the soiling substances is not sufficient.

In addition, when the surface layer is ionically conductive, it is necessary that the surface layer comprises an electronic conductive agent because environmental dependence increases, sufficient conductivity cannot be obtained in a low temperature and low humidity environment where excessive discharge due to soiling substances is generally likely to occur, and charge responsiveness is slow, and thus sufficient charge cannot be applied to the soiling substance in a short time in an accelerated process.

The electrophotographic member will be described with reference to FIG. 1 using a conductive roller as an example. FIG. 1 is a cross-sectional view illustrating a configuration of a cross section perpendicular to the longitudinal direction which is an axial direction of the conductive roller. The conductive roller comprises a substrate 11 having a columnar conductive surface, and an elastic layer 12 formed on an outer peripheral surface of the substrate 11, that is, an outer surface, and a surface layer 13 which is in contact with a surface of the elastic layer 12 opposite to a surface facing the substrate 11.

Substrate (Support) Having Conductive Surface

The material constituting the substrate 11 can be appropriately selected and used from materials known in the field of electroconductive members for electrophotography and materials that can be used as electroconductive members. Examples thereof include metals or alloys such as aluminum, stainless steel, a conductive synthetic resin, iron, and a copper alloy.

Furthermore, the substrate may be subjected to an oxidation treatment or a plating treatment with chromium, nickel, or the like. As the type of plating, either electroplating or electroless plating can be used. From the viewpoint of dimensional stability, electroless plating is preferable. Examples of the electroless plating used here include nickel plating, copper plating, gold plating, and various other alloy plating.

The plating thickness is preferably 0.05 μm or more, and in consideration of the balance between work efficiency and rust prevention ability, the plating thickness is preferably from 0.10 to 30.00 μm. The columnar shape of the substrate 11 may be a solid columnar shape or a hollow columnar shape (cylindrical shape). The outer diameter of the substrate is preferably in a range of from 3 to 10 mm.

Furthermore, if necessary, partial processing is performed for mounting to the electrophotographic apparatus. When a medium-resistance layer or an insulating layer is present between the substrate and the elastic layer, it may be impossible to quickly supply charges after consumption of charges by discharge. Therefore, it is preferable that the elastic layer is directly provided on the substrate, or the elastic layer is provided on the outer periphery of the substrate through only an intermediate layer comprising a thin film such as a primer and a conductive resin layer.

As the primer, a known primer can be selected and used according to the rubber material for forming the elastic layer, the material of the substrate, and the like. Examples of the material of the primer include thermosetting resins and thermoplastic resins, and specifically, known materials such as phenolic resins, urethane resins, acrylic resins, polyester resins, polyether resins, and epoxy resins can be used.

Elastic Layer

The elastic layer comprises an insulating first phase comprising at least a crosslinked product of a first rubber, and a second phase comprising a crosslinked product of a second rubber different from the first rubber and conductive particles. The elastic layer has a matrix-domain structure in which domains composed of the second phase are dispersed in a matrix composed of the first phase in a region of 5 μm or more in the depth direction from an interface between the elastic layer and the surface layer to the elastic layer. Although details will be described later, in order to satisfy the requirement (B), it is preferable to reduce the difference in the SP value ($(J/cm^3)^{0.5}$) between the first rubber and the second rubber, and the SP value difference is preferably 3.0 or less, and more preferably 1.0 or less.

Matrix

The matrix comprises a first rubber. The volume resistivity ρm of the matrix in the region B is preferably from $1.0\times10^8$ to $1.0\times10^{17}$ Ωcm. By setting the volume resistivity of the matrix to $1.0\times10^8$ Ωcm or more, it is possible to suppress the disruption of the charge exchange between the conductive domains by the matrix. In addition, by setting the volume resistivity ρm to $1.0\times10^{17}$ Ωcm or less, it is possible to smoothly perform discharge from the electrophotographic member to the member to be charged when a charging bias is applied between the substrate and the member to be charged.

The volume resistivity ρm of the matrix is preferably from $1.0\times10^8$ to $1.0\times10^{15}$ Ωcm, and more preferably from $1.0\times10^8$ to $1.0\times10^{14}$ Ωcm. A method for measuring the volume resistivity ρm of the matrix will be described later.

The volume resistivity ρm of the matrix can be controlled by the volume resistivity of the first rubber used for the matrix.

First Rubber

The first rubber is a component having the largest blending ratio in the rubber composition for forming an elastic layer, and the crosslinked product of the first rubber governs the mechanical strength of the elastic layer. Therefore, as the first rubber, one that exhibits the strength required for the electroconductive member for electrophotography is used for the elastic layer after cross-linking. Preferred examples of the first rubber are as follows. Natural rubber (NR), isoprene rubber (IR), butadiene rubber (BR), styrene-butadiene rubber (SBR), butyl rubber (IIR), ethylene-propylene rubber (EPM), ethylene-propylene-diene terpolymer rubber (EPDM), chloroprene rubber (CR), acrylonitrile butadiene rubber (NBR), hydrogenated NBR (H-NBR), and silicone rubber.

The first rubber preferably comprises at least one selected from the group consisting of isoprene rubber (IR), butadiene rubber (BR), styrene-butadiene rubber (SBR), and acrylonitrile butadiene rubber (NBR), and more preferably comprises at least one selected from the group consisting of styrene-butadiene rubber (SBR), and acrylonitrile butadiene rubber (NBR).

The first rubber forming the matrix can comprise a reinforcing material to such an extent that conductivity is not affected. Examples of the reinforcing material include reinforcing carbon black having low conductivity. Specific examples of the reinforcing carbon black include FEF, GPF, SRF, and MT carbon.

Furthermore, a filler such as calcium carbonate, a processing aid, a vulcanization aid, a vulcanization accelerator, a vulcanization promotion aid, a vulcanization retardant, an anti-aging agent, a softener, a dispersing agent, a colorant, and the like may be added to the first rubber as necessary.

Domain

The domain comprises a crosslinked product of a second rubber different from the first rubber and conductive particles. Here, the conductivity is defined as a volume resistivity of less than $1.0\times10^8$ Ωcm. On the other hand, the insulating properties mean that the volume resistivity is $1.0\times10^8$ Ωcm or more.

Second Rubber

As a specific example of the second rubber, for example, at least one selected from the group consisting of natural rubber (NR), isoprene rubber (IR), butadiene rubber (BR), acrylonitrile butadiene rubber (NBR), styrene butadiene rubber (SBR), butyl rubber (IIR), ethylene propylene rubber (EPM), ethylene propylene diene rubber (EPDM), chloroprene rubber (CR), nitrile rubber (NBR), hydrogenated nitrile rubber (H-NBR), silicone rubber, and urethane rubber (U) is preferable.

The second rubber preferably comprises at least one selected from the group consisting of isoprene rubber (IR), butadiene rubber (BR), styrene-butadiene rubber (SBR), acrylonitrile butadiene rubber (NBR), and ethylene propylene diene rubber (EPDM), and more preferably comprises at least one selected from the group consisting of styrene-butadiene rubber (SBR), acrylonitrile butadiene rubber (NBR), and ethylene propylene diene rubber (EPDM).

Conductive Particles

Examples of the conductive particles include particles of an electronic conductive agent such as a carbon material such as conductive carbon black or graphite, a conductive oxide such as titanium oxide or tin oxide, a metal such as Cu or Ag, a conductive oxide, or particles of electron conductive agents, such as particles coated on the surface with conductive oxides or metals to become conductive. Two or more types of these conductive particles may be appropriately blended and used.

The ratio $S_c/S$ of the cross-sectional area $S_c$ of the conductive particles to the cross-sectional area S of the domain in the region B is preferably 20.0 to 30.0%, and more preferably 25.0 to 30.0%. By filling the domain with the conductive particles at a high density in this manner, it is easy to make the unevenness of the outer peripheral surface of the domain small. The upper limit of the ratio of the cross-sectional area of the conductive particle to the cross-sectional area of the domain is not particularly limited, but is preferably 30.0% or less.

In order to obtain a domain densely filled with conductive particles, it is preferable to use conductive carbon black as the conductive particles. That is, the conductive particles preferably comprise carbon black. The carbon black is preferably at least one selected from the group consisting of, for example, gas furnace black, oil furnace black, thermal black, lamp black, acetylene black, and ketjen black.

Among these, carbon black having a DBP absorption amount of from 40 to 80 $cm^3/100$ g can be particularly suitably used. The DBP absorption amount ($cm^3/100$ g) is a volume of dibutyl phthalate (DBP) to which 100 g of carbon black can be adsorbed, and is measured in accordance with Japanese Industrial Standard (JIS) K6217-4:2017 (carbon black for rubber-basic characteristics—Part 4: Method for determining oil absorption amount (including compressed sample)). In general, carbon black has a cluster-like higher order structure in which primary particles having an average particle diameter of from 10 to 50 nm are aggregated. This cluster-like higher order structure is called a structure, and the degree thereof is quantified by the DBP absorption amount ($cm^3/100$ g).

Generally, carbon black having a developed structure has high reinforcing properties with respect to rubber, is hardly incorporated into rubber, and has a very high shear torque during kneading. Therefore, it is difficult to increase the filling amount in the domain.

On the other hand, the conductive carbon black having a DBP absorption amount within the above range has an undeveloped structure, and thus the carbon black is less aggregated and has good dispersibility in rubber. Therefore, the filling amount into the domain can be increased, and as a result, it is easy to obtain a domain having an outer shape closer to a sphere.

Further, in the carbon black in which the structure is developed, the carbon blacks are easily aggregated with each other, and the aggregate easily becomes a lump having a large uneven structure. On the other hand, conductive carbon black having a DBP absorption amount within the above range is preferable because it is difficult to form aggregates. The content of the conductive particles such as conductive carbon black is preferably from 20 to 150 parts by mass with respect to 100 parts by mass of the second rubber comprised in the domain. The content is more preferably from 50 to 100 parts by mass.

The volume resistivity of the domain is preferably $1.0\times10^4$ Ωcm or less. When the volume fraction is $1.0\times10^4$ Ωcm or less, conduction can be performed at a volume fraction of domains stably forming a matrix-domain structure. The volume resistivity of the domain may be measured by the same method as all the methods for measuring the volume resistivity of the matrix except that the measurement location is changed to a location corresponding to the domain and the applied voltage at the time of measuring the current value is changed to 1 V.

In order to obtain the electrophotographic member defined in the requirement (A), the average value of the number of domains in a 15 μm square observation region placed in the region B is preferably 20 to 300, and more preferably 40 to 300. When the length of the elastic layer in the longitudinal direction is L, the observation region is a region of 15 μm square placed in the region B by cutting out a plane parallel to the longitudinal direction of the electrophotographic member from the surface layer side at three positions of L1/4, L2/4, and L3/4. The arithmetic mean value of these three observation regions is adopted.

When the number of the domains is 20 or more, sufficient conductivity can be obtained as an electrophotographic member, and sufficient charge supply can be achieved even in a high-speed process. In addition, when the number is 300 or less, a sufficient distance between domains can be maintained, and aggregation of domains due to repetition of image output can be suppressed, and thus uniform discharge can be easily achieved.

Method for Manufacturing Elastic Layer

The elastic layer of the electrophotographic member can be formed, for example, through a method including the following steps (i) to (iv).

Step (i): a step of preparing a rubber composition for domain formation (hereinafter also referred to as "CMB") comprising conductive particles and a second rubber.

Step (ii): a step of preparing a rubber composition for matrix formation (hereinafter also referred to as "MRC") comprising a first rubber.

Step (iii): a step of kneading CMB and MRC to prepare a rubber composition for forming an elastic layer having a matrix-domain structure.

Step (iv): a step of forming the layer of the rubber composition for forming an elastic layer prepared in step (iii) directly or via another layer on a substrate, and curing the layer of the rubber composition to form an elastic layer.

The mixing ratio (CMB:MRC) of CMB and MRC in terms of mass in the rubber composition for forming an elastic layer is preferably 10:90 to 40:60, and more preferably 20:80 to 30:70. The rubber composition for forming an elastic layer may comprise known additives such as a vulcanizing agent and a vulcanization accelerator as necessary. The elastic layer is, for example, a crosslinked product (vulcanized product) of the rubber composition for forming an elastic layer.

In order to obtain a domain satisfying the requirement (C), it is effective to prepare CMB by adding a large amount of carbon black having a DBP absorption amount of preferably from 40 to 170 $cm^3/100$ g, more preferably from 40 to 90 $cm^3/100$ g to the second rubber and kneading the mixture as conductive particles used for preparing CMB. In this case, the blending amount of the carbon black with respect to the second rubber in the CMB is preferably, for example, from 40 to 200 parts by mass with respect to 100 parts by mass of the second rubber. In particular, the content is preferably from 50 to 100 parts by mass.

The ratio of the cross section of the conductive particle to the cross-sectional area of the domain in the domain may be measured as follows. First, a thin piece of the elastic layer is prepared. In order to suitably observe the matrix-domain structure, a pretreatment, such as a dyeing treatment or a deposition treatment, may be performed to suitably obtain a contrast between the conductive phase and the insulating phase.

The thin piece subjected to fracture surface formation and pretreatment can be observed with a scanning electron microscope (SEM) or a transmission electron microscope (TEM). Among these, it is preferable to perform observation with a SEM at a magnification of 1,000 to 100,000 from the viewpoint of the accuracy of quantification of the area of the domain as the conductive phase. The obtained observation image is binarized and analyzed using an image analysis device or the like to obtain the above ratio. A specific procedure will be described later.

In addition, in order to further reduce the electric field concentration between the domains, it is preferable to bring the outer shape of the domain closer to a sphere. For this purpose, it is preferable to control the domain diameter to be small. Examples of the method include a method in which the domain diameter of CMB is controlled to be small in a step of preparing a rubber composition in which domains of CMB are formed in a matrix of MRC by kneading MRC and CMB to cause phase separation between MRC and CMB. When the domain diameter of the CMB is reduced, the total specific surface area of the CMB is increased, and the interface with the matrix is increased, and thus tension for reducing the tension acts on the interface of the domain of the CMB. As a result, the outer shape of the domain of the CMB is closer to a sphere. Therefore, the value of A/B can be easily controlled to 1.00 to 1.10.

Here, Taylor's equation (Equation (1)), Wu's empirical equation (Compounds represented by Equations (2) and (3)), and Tokita's equation (Equation (4)) are known as factors that determine a domain diameter D in a matrix-domain structure formed when two incompatible polymers are melt-kneaded. (Sumitomo Chemical Co., Ltd., 2003-II, 42)

Taylor's Equation $$D = [C \cdot \sigma / \eta m \cdot \gamma] \cdot f(\eta m / \eta d) \quad (1)$$

Wu's Empirical Equation $$\gamma \cdot D \cdot \eta m / \sigma = 4(\eta d / \eta m)^{0.84} \cdot \eta d / \eta m > 1 \quad (2)$$

$$\gamma \cdot D \cdot \eta m / \sigma = 4(\eta d / \eta m)^{-0.84} \cdot \eta d / \eta m > 1 \quad (3)$$

Tokita's Equation $$D \cong \frac{12 \times P \times \sigma \times \phi}{\pi \times \eta \times \gamma}\left(1 + \frac{4 \times P \times \phi \times EDK}{\pi \times \eta \times \gamma}\right) \quad (4)$$

In the Equations (1) to (4), D represents the domain diameter of CMB (maximum Feret diameter Df), C represents a constant, σ represents interfacial tension, nm represents the viscosity of the matrix, and ηd represents the viscosity of the domain. In Equation (4), γ represents a shear rate, η represents a viscosity of the mixed system, P represents a collision coalescence probability, φ represents a domain phase volume, and EDK represents a domain phase break energy.

From the above Equations (1) to (4), in order to reduce the domain diameter D of CMB, for example, it is effective to control physical properties with CMB and MRC and kneading conditions in the step (iii). Specifically, it is effective to control the following four items (a) to (d).

(a) Difference in interfacial tension σ between CMB and MRC (b) Ratio (ηm/ηd) of viscosity (ηd) of CMB and viscosity (ηm) of MRC (c) Shear rate (γ) at the time of kneading CMB and MRC and energy amount (EDK) at the time of shearing in step (iii)

(d) Volume fraction of CMB to kneaded product of CMB and MRC in step (iii)

(a) Difference in Interfacial Tension Between CMB and MRC

Generally, when two types of incompatible rubbers are mixed, phase separation occurs. This is because, since the interaction between the same polymers is stronger than the interaction between the heterologous polymers, the same polymers are aggregated with each other, and the free energy is lowered and stabilized. Since the interface of the phase separation structure is in contact with the heterologous polymer, the free energy is higher than that of the inside stabilized by the interaction between the same molecules. As a result, in order to reduce the free energy of the interface, interfacial tension is generated to reduce the area which is in contact with the heterologous polymer. In a case where the interfacial tension is small, even a heterologous polymer tends to be mixed more uniformly in order to increase entropy. The state of uniform mixing is dissolution, and the SP value as a measure of solubility and the interfacial tension tend to correlate. That is, it is considered that the interfacial tension difference between the CMB and the MRC correlates with the SP value difference between the CMB and the MRC. Therefore, it is possible to control by a combination of MRC and CMB, particularly a combination of the first rubber and the second rubber.

As the first rubber in MRC and the second rubber in CMB, a combination is preferable in which the absolute value of the difference in solubility parameter (SP value) between the first rubber and the second rubber is 0.4 to 5.7 $(J/cm^3)^{0.5}$, particularly, a combination is preferable in which the absolute value of the difference in SP value is 0.4 to 4.7 $(J/cm^3)^{0.5}$, and further, a combination is preferable in which the absolute value of the difference in SP value is 0.4 to 3.0 $(J/cm^3)^{0.5}$. By using a combination of rubbers in which the absolute value of the difference between the SP values is within the above range, a phase separation structure can be more stably formed, and the domain diameter D of CMB can be reduced.

The SP value $(J/cm^3)^{0.5}$ of the first rubber is preferably 16.8 to 22.0, and more preferably 17.0 to 21.7.

The SP value $(J/cm^3)^{0.5}$ of the second rubber is preferably 15.8 to 22.0, and more preferably 16.0 to 20.0.

Preferable combinations of the first rubber and the second rubber include, for example, the following combinations on the premise that the absolute value of the difference between the SP values is within the above range.

the first rubber is NBR and the second rubber is SBR,
the first rubber is SBR and the second rubber is NBR,
the first rubber is NBR and the second rubber is EPDM,
the first rubber is SBR and the second rubber is EPDM,
the first rubber is NBR and the second rubber is IR, or
the first rubber is BR and the second rubber is NBR.

Method for Measuring SP Value

The SP values of the first rubber and the second rubber comprised in each of the MRC and the CMB can be accurately calculated by creating a calibration curve using a material of which SP value is known. As the known SP value, a catalog value of a material manufacturer can also be used. For example, the SP value of NBR and SBR is almost determined by the content ratio of acrylonitrile or styrene without depending on the molecular weight. Therefore, the rubber constituting the matrix and the domain is analyzed for the content ratio of acrylonitrile or styrene using an analysis method such as pyrolysis gas chromatography (Py-GC) and solid NMR. Then, the SP value can be calculated based on the content ratio from the calibration curve obtained from the material of which SP value is known. The SP value of isoprene rubber is determined by isomeric structures of 1,2-polyisoprene, 1,3-polyisoprene, 3,4-polyisoprene, cis-1,4-polyisoprene, trans-1,4-polyisoprene, and the like. Therefore, similarly to SBR and NBR, the isomer content ratio is analyzed by Py-GC, solid NMR, or the like, and the SP value can be calculated from a material of which SP value is known.

The SP value of a material of which SP value is known is obtained by a Hansen sphere method.

(b) Viscosity Ratio Between CMB and MRC

As the viscosity ratio (ηd/ηm) between CMB and MRC is closer to 1, the maximum Feret diameter of the domain can be made smaller. The viscosity ratio between CMB and MRC can be adjusted by selecting the Mooney viscosity of CMB and MRC and blending the type and amount of the filler. It is also possible to add a plasticizer such as paraffin oil to such an extent that the formation of the phase separation structure is not hindered. The viscosity ratio can be adjusted by adjusting the temperature at the time of kneading. The viscosity of CMB or MRC can be obtained by measuring the Mooney viscosity $ML_{(1+4)}$ at the rubber temperature during kneading according to JIS K6300-1: 2013.

(c) Shear Rate at Time of Kneading MRC and CMB and Energy Amount at Time of Shearing The maximum Feret diameter Df of the domain can be made smaller as the shear rate at the time of kneading MRC and CMB is higher and the energy amount at the time of shearing is greater.

The shear rate can be increased by increasing the inner diameter of a stirring member such as a blade or a screw of the kneader, reducing the gap from the end surface of the stirring member to the inner wall of the kneader, or increasing the rotation speed. The energy at the time of shearing can be increased by increasing the rotation speed of the stirring member or increasing the viscosity of the first rubber in CMB and the second rubber in MRC.

(d) Volume Fraction of Domain (Volume Fraction of CMB to Kneaded Product of CMB and MRC)

The volume fraction of CMB to the kneaded product of CMB and MRC correlates with the collision coalescence probability of CMB to MRC. Specifically, when the volume fraction of the CMB with respect to the kneaded product of the CMB and the MRC is reduced, the collision coalescence probability between the CMB and the MRC is reduced. That is, the size of the domain can be reduced by reducing the volume fraction of the domain in the elastic layer within a range in which necessary conductivity can be obtained.

Method for Confirming Matrix-Domain (M-D) Structure

The matrix-domain structure can be confirmed, for example, by the following method. That is, a thin piece of the elastic layer is cut out from the elastic layer to prepare an observation sample. Examples of the means for cutting out the thin piece include a razor blade, a microtome, and a FIB.

The observation sample is subjected to a treatment (for example, dyeing treatment and deposition treatment) that can facilitate distinction between the matrix and the domain as necessary. Then, the observation sample is observed with a laser microscope, a SEM, or a TEM. A more specific procedure will be described later.

Method for Measuring Perimeter Pf Domain, Envelope Perimeter, Number of Domains, and Average Number of Domains The method for measuring perimeter of the domain, the envelope perimeter, and the number of domains can be, for example, performed as follows.

First, a section is prepared by a method similar to the method in the measurement of the volume resistivity of the matrix described above. Subsequently, a thin piece having a fracture surface can be formed by means of a lower freezing fracture method, a cross polisher method, a focused ion beam (FIB) method, or the like. In consideration of the smoothness of the fracture surface and the pretreatment for observation, the FIB method is preferable. In addition, in order to suitably observe the matrix-domain structure, a pretreatment, such as a dyeing treatment or a deposition treatment, may be performed to suitably obtain a contrast between the conductive phase and the insulating phase.

The thin piece subjected to fracture surface formation and pretreatment can be observed by a SEM or a TEM. Among these, it is preferable to perform observation with a SEM at a magnification of 1,000 to 100,000 from the viewpoint of the accuracy of quantification of the perimeter of the domain and the envelope perimeter.

The measurement of the perimeter of the domain, the envelope perimeter, and the number of domains can be obtained by quantifying the captured image as described above. Gray-scaling of 8 bits is performed on the fracture surface image obtained by the observation with the SEM using image processing software such as trade name: Image-Pro Plus (manufactured by Planetron, Inc.) to obtain a 256 gradation monochrome image. Next, the black and white of the image is inverted such that the domain in the fracture surface becomes white, and binarization is performed. Next, the perimeter, the envelope perimeter, and the number of domains may be calculated from each of the domain groups in the image. A more specific procedure will be described later.

For the above measurement, when the length of the electrophotographic member in the longitudinal direction is L, sections of the sample are cut out from a center in the longitudinal direction and a total of three points of L/4 (that is, L1/4, L2/4, and L3/4) from both ends toward the center. A plane parallel to the longitudinal direction of the electrophotographic member is cut out from the surface layer side of the cut section, and the above observation is performed using a plane of a depth region (region B) having a depth of from 5 to 6 μm in the elastic layer direction from the elastic layer/surface layer interface.

In order to satisfy the requirement (B), in the step of forming a rubber composition for forming an elastic layer on a substrate in the step (iv), it is preferable to aggregate domains in the vicinity of the outer surface of the elastic layer at the time of forming the elastic layer. The method will be described below.

Figure 2:
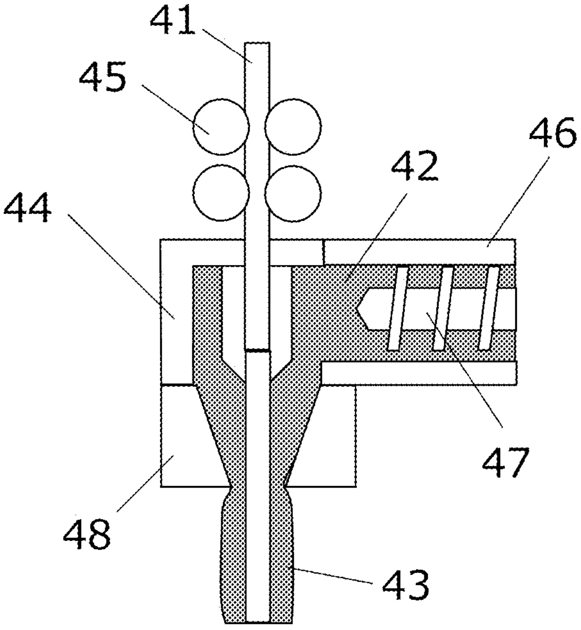
FIG. 2 is a schematic view of a crosshead extrusion molding machine.

FIG. 2 is a schematic view of a crosshead extrusion molding machine. The crosshead extrusion molding machine 40 is an apparatus for uniformly coating the entire circumference of the conductive substrate with the rubber composition for forming an elastic layer prepared in the step (iii) to manufacture an unvulcanized rubber roller comprising the electroconductive substrate at the center.

The crosshead extrusion molding machine 40 is provided with a crosshead 44 into which a conductive substrate 41 and a rubber composition 42 for forming an elastic layer are fed, and a conveying roller 45 that feeds the conductive substrate 41 to the crosshead 44. Furthermore, a cylinder 46 for feeding the rubber composition 42 for forming an elastic layer to the crosshead 44 is provided.

The conveying roller 45 continuously feeds the plurality of conductive substrates 41 to the crosshead 44 in the axial direction. The cylinder 46 comprises a screw 47 inside, and feeds the rubber composition 42 for forming an elastic layer into the crosshead 44 by rotation of the screw 47.

When the conductive substrate 41 is fed into the crosshead 44, the entire circumference is covered with the rubber composition 42 for forming an elastic layer fed from the cylinder 46 into the crosshead. Then, the conductive substrate 41 is fed as an unvulcanized rubber roller 43 of which the surface is coated with the rubber composition 42 for forming an elastic layer from a die 48 at the outlet of the crosshead 44.

In the crosshead extrusion molding, the conductive substrate 41 is coated with the rubber composition 42 for forming an elastic layer by using a tubular die at the tip of the crosshead. Since the outer surface side of the rubber composition 42 for forming an elastic layer receives friction with the inner wall portion of the die 48, the shearing force received when the rubber composition is expelled is greater than that in a region other than the outer surface. The shearing force at the inner wall portion of the die is applied in the non-depth direction of the unvulcanized rubber roller, that is, in the direction parallel to the extrusion direction, and accordingly, the domain existing on the outermost surface of the unvulcanized rubber roller is stretched in the non-depth direction.

In addition, when the rubber composition that has been compressed due to application of pressure by the extruder is extruded from the tip of the die, the pressure is released, and the extruded rubber composition expands in the thickness direction (die swell effect). This expansion is affected by the shear rate, and the greater the shear rate, the greater the expansion when the pressure is released. This shear rate increases as the flow rate of rubber increases. In the die wall surface portion, since the flow rate of the rubber decreases due to friction between the wall surface and the flowing rubber, expansion of the rubber after extrusion is small. On the other hand, since the rubber flowing in the region inside the outer surface without friction with the wall surface has a high flow rate of the rubber, the rubber after extrusion greatly expands. Therefore, after the extrusion, the domain is transferred from the inner region where the expansion is large to the outer surface side where the expansion is small.

The domains are extended in the non-depth direction in the die inner wall portion, and the domains are transferred to the outer surface of the domains when extruded from the die, whereby the domains are aggregated in the vicinity of the outer surface of the rubber composition for forming an elastic layer. Thus, an elastic layer satisfying the requirement (B) can be formed.

The phenomenon in which the domain is stretched and the phenomenon in which the domain transfers to the outer surface become apparent by reducing the inner diameter of the die or increasing the flow rate of the rubber at the time of extrusion, and thus are more preferable as manufacturing conditions.

In addition, the transfer of the domain to the outer surface is significant as the domain size is smaller. In order to reduce the size of the domain, there is a method of reducing the difference in SP value between the first rubber in the matrix and the second rubber in the domain. Therefore, as described above, it is more preferable to use a rubber having a small difference in SP value between the two.

It is preferable that $\rho_B/\rho_A \geq 10.0$ is satisfied where $\rho_A$ denotes a volume resistivity of the region A, and $\rho_B$ denotes a volume resistivity of the region B. $\rho_B/\rho_A$ is more preferably 30.0 to 90.0. When $\rho_B/\rho_A$ is within the above range, it is possible to suppress the stagnation of charge transfer at the elastic layer/surface layer interface described above.

$\rho_B/\rho_A$ can be controlled within the above range by the same method as the method of transferring the domain to the outer surface of the elastic layer for satisfying the requirement (B).

Surface Layer

The surface layer comprises an electronic conductive agent. When the surface layer is formed in a form in which the electronic conductive agent is dispersed and comprised in the binder resin, the dispersion proceeds sufficiently, which is also preferable in terms of physical durability of the surface layer. That is, the surface layer preferably comprises a binder resin and an electronic conductive agent dispersed in the binder resin. The surface layer may comprise roughening particles, a surface release agent, and the like as necessary.

Electronic Conductive Agent

Examples of the electronic conductive agent comprised in the surface layer include conductive particles such as metal oxide-based conductive particles of conductive carbon black, titanium oxide, tin oxide, zinc oxide, and the like, and metal-based conductive particles of aluminum, iron, copper, silver, and the like. That is, the electronic conductive agent is preferably conductive particles. These conductive particles can be used alone or in combination of two or more types thereof.

As the conductive particles, composite particles obtained by coating silica particles with conductive particles can also be used. The conductive particles used for the surface layer preferably comprise carbon black. Since carbon black has low specific gravity and high conductivity, it is possible to ensure sufficient conductivity as a surface layer by adding a small amount of carbon black to the binder resin. In the present disclosure, since it is preferable to keep the hardness of the surface layer low, carbon black suitable for addition in a small amount is suitable.

The content of the electronic conductive agent is preferably 10 to 40 parts by mass and more preferably 15 to 30 parts by mass with respect to 100 parts by mass of the binder resin.

Binder Resin

As the binder resin, a known binder resin can be used. Examples thereof include various synthetic resins, natural rubber, vulcanized natural rubber, and rubber such as synthetic rubber. As the binder resin, a fluororesin, a polyamide resin, an acrylic resin, a polyurethane resin, a silicone resin, a butyral resin, a styrene-ethylene-butylene-olefin copolymer, an olefin-ethylene-butylene-olefin copolymer, and the like can be used.

The binder resins may be used singly or in combination of two or more types thereof.

The binder resin preferably comprises a polyurethane resin. The polyurethane resin is preferably at least one selected from the group consisting of a polyester-based polyurethane obtained by copolymerizing a polyester polyol and a polyisocyanate, a polycarbonate-based polyurethane obtained by copolymerizing a polycarbonate polyol and a polyisocyanate, and a polyurethane obtained by copolymerizing an ε-caprolactone-modified polyol and a polyisocyanate.

Among these, the binder resin is particularly preferably a resin comprising a polycarbonate structure in order to achieve both flexibility by reducing the universal hardness of the surface layer and high resistance of the surface layer. Since the polycarbonate structure has low polarity, the volume resistivity of the binder resin itself can be maintained high. Specifically, a polycarbonate-based polyurethane obtained by copolymerizing a polycarbonate polyol and a polyisocyanate is preferable.

Examples of the polycarbonate polyol include the following: Polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate)diol, poly(2-ethyl-2 butyltrimethylene) carbonate diol, and random/block copolymers thereof.

The polyisocyanate is selected from commonly used known polyisocyanates, and examples thereof include the following: Toluene diisocyanate (TDI), diphenylmethane diisocyanate (MDI), polymeric diphenylmethane polyisocyanate, hydrogenated MDI, xylylene diisocyanate (XDI), hexamethylene diisocyanate (HDI), isophorone diisocyanate (IPDI), and the like. Among these, aromatic isocyanates such as toluene diisocyanate (TDI), diphenylmethane diisocyanate (MDI), and polymeric diphenylmethane polyisocyanate are more preferably used.

Universal Hardness of Surface Layer

In order to suppress the generation of the soiling substance itself, it is effective that the toner is not cracked or deformed. For this purpose, the surface layer is preferably flexible. As a measure of the hardness of the electrophotographic member, the universal hardness "universal hardness (t=1 μm position)" at a position of 1 μm in depth from the outer surface of the surface layer is preferably 1.0 to 7.0 $N/mm^2$, and more preferably 2.0 to 5.0 $N/mm^2$.

Since the size of the external additive or the toner is on the order of submicrons to several microns, it is preferable to control the hardness in the very vicinity of the outer surface which is a contact surface of the surface layer with the external additive or the toner. Specifically, by setting the universal hardness of the surface at the time when the indenter is pushed by 1 μm from the outer surface of the surface layer to 1.0 $N/mm^2$ or more, it is easy to suppress occurrence of image density non-uniformity due to deformation of the charging roller, which occurs when the charging roller and the electrophotographic photosensitive member are brought into contact with each other in a stationary state for a long period of time. In addition, by setting the universal hardness to 7.0 $N/mm^2$ or less, deformation and cracking of the toner can be suppressed, and thus the absolute amounts of the deformed toner and the pulverized toner remaining on the photosensitive member can be more reliably suppressed.

Furthermore, by setting the universal hardness to 5.0 $N/mm^2$ or less, the surface layer is deformed following the soiling substance, and thus the contact point between the soiling substance and the protruded portion due to the electronic conductive agent exposed on the surface of the surface layer increases, and the injection efficiency of electrons from the protruded portion to the soiling substance is improved. The universal hardness (t=1 μm position) can be controlled by the molecular weight of the polyol component, the ratio between the polyol component and the polyisocyanate component, and the like.

The universal hardness of the surface of the surface layer as the charging roller is measured using, for example, a universal hardness meter (product name: FISCHER SCOPE HM2000XYp, manufactured by Fischer Instrumentation).

The universal hardness is a physical property value obtained by pressing an indenter into an object to be measured while applying a load, and is obtained as "(test load)/(surface area of indenter under test load) ($N/mm^2$)". An indenter such as a quadrangular pyramid is pushed into the object to be measured while applying a predetermined relatively small test load, and a surface area with which the indenter is in contact is obtained from the pushing depth when the predetermined pushing depth is reached, and universal hardness is obtained from the above equation. A more specific procedure will be described later.

Surface Layer Protruded Portion Derived from Electronic Conductive Agent

In order to inject charges into the soiling substance, it is preferable that a protruded portion derived from the exposed portion of the electronic conductive agent (conductive particle) exists on the surface of the surface layer. The size of the protruded portion derived from the exposed portion of the electronic conductive agent is preferably from 5.0 to 100.0 nm. By setting the size to 5.0 nm or more, it is possible to function as a protruded portion as a starting point for more efficiently injecting charges into the soiling substance. In addition, by setting the size to 100.0 nm or less, it is possible to suppress excessive injection of charges into the photosensitive member. As shown in FIG. 9, the size of the protruded portion means the average value (number average particle diameter) of particle diameters 303 of an electronic conductive agent 301 at the part exposed from a binder resin 302. As a method for measuring the size of the protruded portion, an SEM is used to photograph an image of a 2 μm square region, and the particle diameters of 20 particles randomly selected from the obtained image are measured to determine the arithmetic average particle diameter.

In addition, it is preferable that the outer surface of the surface layer has a protruded portion derived from the exposed portion of the electronic conductive agent. In order to inject a charge into the soiling substance using the protruded portion derived from the electronic conductive agent, it is effective to control the number of protruded portions. The number of protruded portions derived from the exposed portion of the electronic conductive agent is preferably 50 to 500 in a region of 2.0 μm in length and 2.0 μm in width (region of 4.0 $\mu m^2$), and more preferably 200 to 400. By setting the number to 50 or more, it is possible to ensure the number of protruded portions as starting points for injecting charges into the soiling substance. In addition, when the number is 500 or less, injection of charges into the photosensitive member can be suppressed. The number of protruded portions can be calculated by photographing an image of a 2 μm square region using a scanning electron microscope (SEM) and calculating the number of conductive points from the binarized image.

Next, a method of exposing the electronic conductive agent (conductive particles) to the surface of the surface layer will be described. When the surface layer is formed on the elastic layer of the electrophotographic member by a dipping coating method, the skin layer is always formed on the outermost surface of the surface layer. For this reason, it is effective to remove the skin layer of the outermost surface in order to expose the electronic conductive agent to the outer surface of the surface layer and generate a protruded portion on the outer surface of the surface layer by the exposed portion.

For example, by performing an ultraviolet treatment, a polishing method, an electrolytic polishing method, a chemical polishing method, an ion milling method, or the like, the surface skin layer made of the binder resin is removed, and the electronic conductive agent is exposed to the outer surface of the surface layer, and thus it is easy to form a protruded portion. In the present disclosure, since the hardness of the surface layer is low, the skin layer can be sufficiently removed and the electronic conductive agent can be exposed on the surface of the surface layer even by performing ultraviolet treatment. The ultraviolet treatment is preferable because the electronic conductive agent can be exposed to the surface of the surface layer while minimizing damage to the surface layer as compared with a polishing method or the like.

The exposed state of the electronic conductive agent can be confirmed using an atomic force microscope (AFM). The height image is acquired in the tapping mode of the AFM. In this case, a part derived from the exposed portion of the electronic conductive agent is confirmed as a protruded portion. When a height image is acquired in a state where the skin layer after dip coating is present, the protruded portion is not confirmed. Further, a phase image is acquired in the tapping mode of the AFM. In this case, since the phase shift of the electronic conductive agent is small and the hardness difference between the binder resin and the electronic conductive agent is large, an image having an extremely large difference in gray contrast is obtained. When a phase image is acquired in a state where the skin layer after dip coating is present, an image having an extremely small phase difference and a low contrast difference is acquired.

Roughening Particles

The surface layer may comprise roughening particles as long as the effect of the present disclosure is not impaired. Examples of the roughening particles include the following: Organic insulating particles such as an acrylic resin, a polycarbonate resin, a styrene resin, a urethane resin, a fluororesin, and a silicone resin; and inorganic insulating particles of particles of titanium oxide, silica, alumina, magnesium oxide, strontium titanate, barium titanate, barium sulfate, calcium carbonate, mica, zeolite, bentonite, and the like.

In the present disclosure, it is preferable to use organic insulating particles having flexibility as roughening particles in order to increase contact opportunities with soiling substances such as external additives and toner due to deformation of the surface layer. These particles may be used alone or in combination of two or more types thereof. The number average particle diameter of the roughening particles is not particularly limited, but is, for example, from 3 μm or more and 30 μm or less.

Ionic Conducting Agent

The surface layer may comprise an ionic conducting agent as long as the effect of the present disclosure is not impaired. In order to transport the charges to be supplied to the adhered soiling from the elastic layer, it is necessary to comprise an electronic conductive agent having good responsiveness in the surface layer, but an ionic conducting agent having relatively low (slow) responsiveness may be supplementarily added. As a result, at a certain moment, the charge that can be supplied to the soiling on the surface is added to the charge that is instantaneously transported from the elastic layer by the electronic conductive agent and the charge that exits the elastic layer slightly before and is transported with a delay by the ionic conducting agent. Therefore, when the electronic conductive agent transports charges mainly, the possibility of insufficient charge supply is further reduced.

The ionic conducting agent is not particularly limited as long as it is an ionic conducting agent exhibiting ionic conductivity, and examples thereof include the following: Inorganic ionic substances such as lithium perchlorate, sodium perchlorate, and calcium perchlorate; quaternary ammonium salts such as lauryltrimethylammonium chloride, stearyltrimethylammonium chloride, and tetrabutylammonium perchlorate; organic acid inorganic salts such as lithium trifluoromethanesulfonate and potassium perfluorobutanesulfonate. These can be used alone or in combination of two or more types thereof.

Among the ionic conducting agents, when the ionic conducting agent has a functional group that is likely to form a bond with the material constituting the surface layer, the ionic conducting agent is immobilized inside the surface layer, and thus the characteristics are easily maintained for a long period of time, which is preferable. As an example, an ionic conducting agent having an OH group when having a urethane bond in the surface layer. More preferably, the ionic conducting agent preferably has an imidazolium structure in the structure thereof. Since it is easy to delocalize charges on the imidazolium ring and it is difficult to generate charge uneven distribution in the structure, homogeneous charge transfer in the surface layer and more homogeneous charge supply to soiling can be expected.

Since the ionic conducting agent is used as an auxiliary role of the electronic conductive agent, the amount of the ionic conducting agent is smaller than that of the electronic conductive agent constituting the surface layer, and is preferably from 0.01 to 5.0 parts by mass with respect to 100 parts by mass of the binder resin. The content is more preferably from 0.01 to 2.0 parts by mass.

Other Additives

Other additives may be added to the surface layer as necessary on the premise that the effects of the present disclosure are not impaired. As the additive, a chain extender, a crosslinking agent, a pigment, a silicone additive, an amine as a catalyst, a tin complex, or the like may be added. When the silicone additive is added to the surface layer, the addition of the silicone additive is particularly preferable in order to increase the resistance of the surface layer, apply slippage to the surface layer, suppress injection of charges into the photosensitive member, and improve the abrasion resistance of the surface layer.

Layer Thickness of Surface Layer

The surface layer preferably has a thickness of 0.1 to 100 μm. The thickness of the surface layer is more preferably 1 to 50 μm, still more preferably 5 to 30 μm, and still furthermore preferably 10 to 30 nm. The layer thickness of the surface layer can be measured by cutting out a roller cross section with a sharp blade and observing the roller cross section with an optical microscope or an electron microscope.

Volume Resistivity of Surface Layer

When the electrophotographic member is used as the charging roller, the volume resistivity of the surface layer of the charging roller is preferably $1.0\times10^{10}$ to $1.0\times10^{16}$ Ω·cm. It is more preferably $5.0\times10^{10}$ to $1.0\times10^{16}$ Ω·cm. When the electrophotographic member is used as a charging roller, it is preferable to set the volume resistivity of the surface layer to a large value. By increasing the volume resistivity of the surface layer, the soiling substance easily returns to the photosensitive member, and the adhesion amount of the soiling substance accumulated on the charging roller can be further reduced.

The present inventors consider that when a negatively charged soiling substance is in direct contact with a surface layer, particularly a binder resin in which an electronic conductive agent (conductive particles) is not exposed on the surface, negative charges of the soiling substance may move to the surface layer side of the charging roller, and the negative charges of the soiling substance may decay. In order to suppress attenuation of negative charges of a soiling substance, the surface layer preferably has high resistance, and for this purpose, the volume resistivity of the surface layer is preferably $1.0\times10^{10}$ Ω·cm or more.

In addition, the present inventors have confirmed that when the volume resistivity of the surface layer is low, charges are injected from the charging roller to the photosensitive member. This phenomenon is significant when the hardness of the surface layer is low and when a peripheral speed difference is provided between the charging roller and the photosensitive member. At the time of actual image output, the injected charge amount is added to the charge amount due to discharge. Therefore, when the injected charge amount is large, it may be difficult to stably maintain the surface potential of the photosensitive member. A standard of the injected charge amount for maintaining the output at a stable image density is 50 V or less, and for this purpose, it is more preferable to set the volume resistivity of the surface layer to $1.0\times10^{10}$ Ω·cm or more.

In addition, in order to stabilize discharging as a charging roller, the volume resistivity of the surface layer is preferably $1.0\times10^{16}$ Ω·cm or less. The injected charge amount from the charging roller to the photosensitive member can be estimated, for example, as follows.

The surface potential of the photosensitive member is measured when a voltage is applied to the charging roller under a condition that the charging roller does not discharge in a high temperature and high humidity environment (temperature: 30° C., relative humidity: 80%) in which the injected charge amount increases (for example, DC-500V). For the measurement of the volume resistivity of the surface layer, a measurement value measured in a conductive mode using an atomic force microscope (AFM) can be adopted. A sheet is cut out from the surface layer of the charging roller using a manipulator, and metal deposition is applied to one surface of the surface layer. A direct current power supply is connected to the metal-deposited surface, a voltage is applied, a free end of the cantilever is brought into contact with the other surface of the surface layer, and a current image is obtained through the AFM main body. The current value on the surface of randomly selected 100 locations is measured, and the volume resistivity can be calculated from the average current value of the top 10 locations of the measured low current value, the average film thickness, and the contact area of the cantilever.

Method for Manufacturing Surface Layer

The method for forming the surface layer is not particularly limited, and examples thereof include spraying with a coating material obtained by adding a solvent to a raw material, immersion (dipping coating method), and roll coating. The dipping coating method is simple and excellent in production stability as a method for forming a surface layer. After the coating, an additional treatment such as heating is performed as necessary. The method for manufacturing the surface layer preferably includes a step of coating a coating material having a raw material of a binder resin and a raw material comprising an electronic conductive agent to the outer surface of the elastic layer, and a step of curing the raw material of the binder resin to form the surface layer.

Process Cartridge

Figure 3:
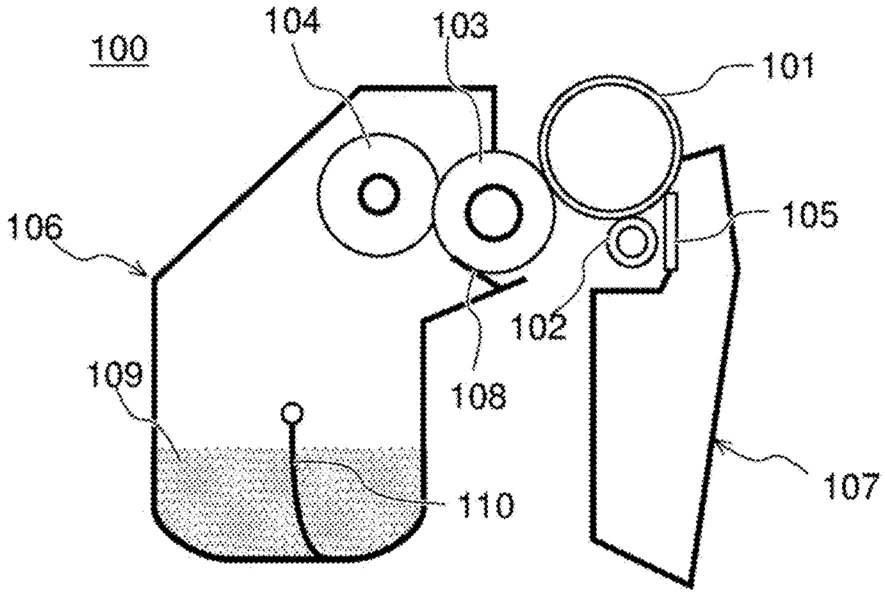
FIG. 3 is a schematic cross-sectional view of a process cartridge.

At least one aspect of the present disclosure provides a process cartridge comprising the electrophotographic member of the present disclosure. FIG. 3 is a schematic cross-sectional view of an electrophotographic process cartridge 100 comprising an electrophotographic member according to an embodiment of the present disclosure as a charging roller. This process cartridge is configured to integrate a developing apparatus and a charging device and to be detachable from a main body of an electrophotographic image forming apparatus.

The developing apparatus is formed by integrating at least a developing roller 103, a toner container 106, and a toner 109, and may comprise a toner supply roller 104, a developing blade 108, and a stirring blade 110 as necessary.

The charging device is formed by integrating at least a photosensitive drum 101 and a charging roller 102, and may comprise a cleaning blade 105 and a waste toner container 107. A voltage is applied to each of the charging roller 102, the developing roller 103, the toner supply roller 104, and the developing blade 108.

Further, the electrophotographic member according to the present disclosure can be used as a charging roller, a developing roller, a developing blade, and a toner supply roller. The electrophotographic member is preferably a charging member, and the electrophotographic member is more preferably a charging roller.

Electrophotographic Image Forming Apparatus

Figure 4:
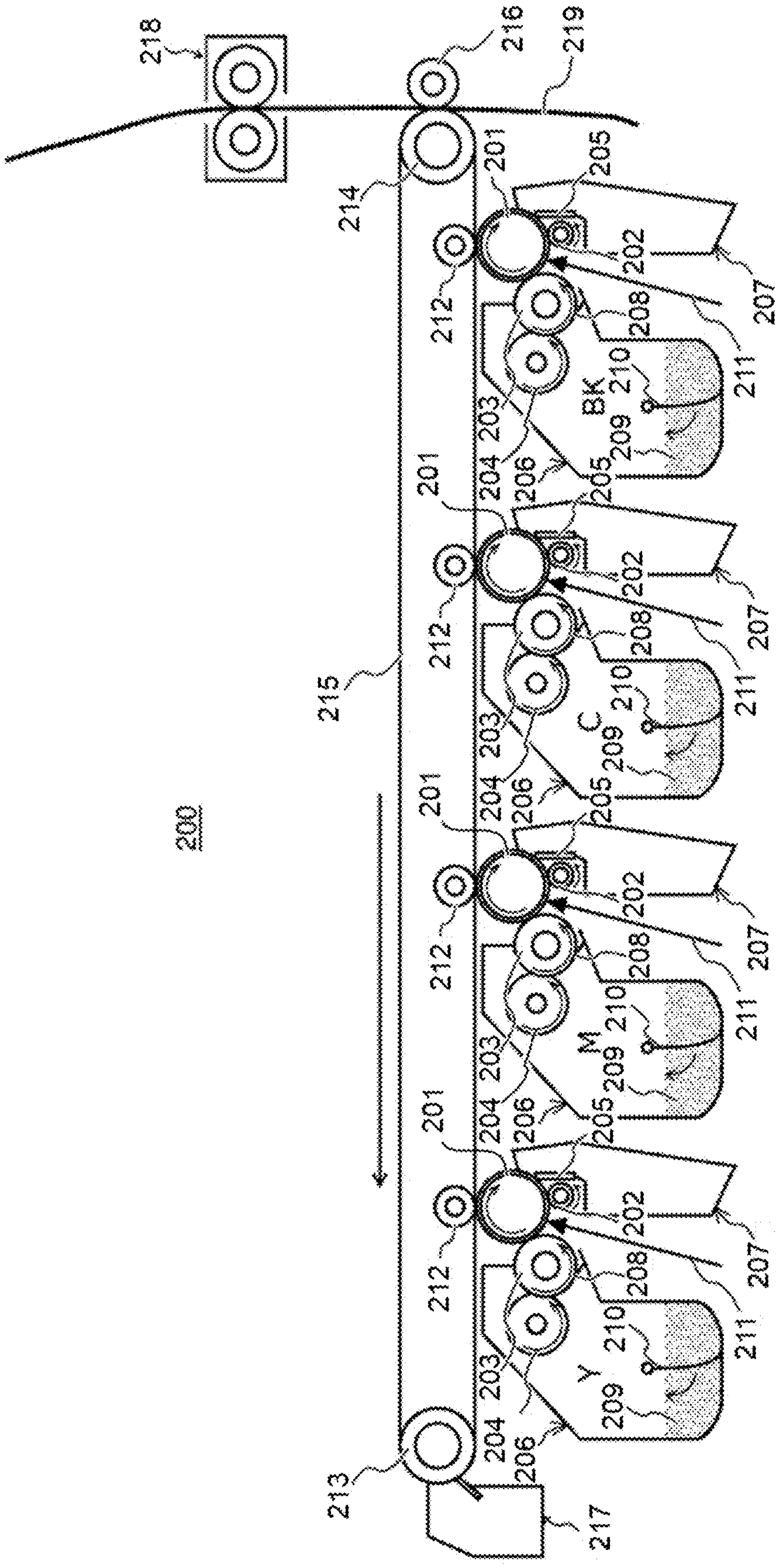
FIG. 4 is a schematic view of an electrophotographic image forming apparatus.

At least one aspect of the present disclosure provides an electrophotographic image forming apparatus comprising the electrophotographic member of the present disclosure. FIG. 4 is a schematic configuration view of an electrophotographic image forming apparatus 200 using an electrophotographic member according to an embodiment of the present disclosure as a charging roller. This apparatus is a color electrophotographic apparatus to which the process cartridge 100 is detachably attached. In each process cartridge, toners of respective colors of black BK, magenta M, yellow Y, and cyan C are used.

A photosensitive drum 201 rotates in an arrow direction, is uniformly charged by a charging roller 202 to which a voltage is applied from a charging bias power supply, and an electrostatic latent image is formed on a surface thereof by exposure light 211. On the other hand, the toner 209 stored in a toner container 206 is supplied to a toner supply roller 204 by a stirring blade 210 and conveyed onto a developing roller 203. Then, the surface of the developing roller 203 is uniformly coated with the toner 209 by the developing blade 208 disposed in contact with the developing roller 203, and charge is applied to the toner 209 by triboelectric charging. The electrostatic latent image is developed by being applied with the toner 209 conveyed by the developing roller 203 disposed in contact with the photosensitive drum 201, and is visualized as a toner image.

The visualized toner image on the photosensitive drum is transferred to an intermediate transfer belt 215 supported and driven by a tension roller 213 and an intermediate transfer belt driver roller 214 by a primary transfer roller 212 to which a voltage is applied by the primary transfer bias power supply. The toner images of the respective colors are sequentially superimposed to form a color image on the intermediate transfer belt.

The transfer material 219 is fed into the apparatus by a sheet feeding roller and conveyed between the intermediate transfer belt 215 and a secondary transfer roller 216. A voltage is applied to the secondary transfer roller 216 from a secondary transfer bias power supply, and the secondary transfer roller transfers the color image on the intermediate transfer belt 215 to the transfer material 219. The transfer material 219 to which the color image has been transferred is subjected to a fixing process by the fixing unit 218, discarded outside the apparatus, and the printing operation is terminated.

On the other hand, the toner remaining on the photosensitive drum without being transferred is scraped off by a cleaning blade 205 and stored in a waste toner storage container 207, and the cleaned photosensitive drum 201 repeats the above-described process. In addition, the toner remaining on the primary transfer belt without being transferred is also scraped off by a cleaning device 217.

Although the color electrophotographic apparatus is illustrated as an example, in the monochrome electrophotographic apparatus (not illustrated), the process cartridge is only a black toner used product. The monochrome image is directly formed on the transfer material by the process cartridge and the primary transfer roller (without the secondary transfer roller) without using the intermediate transfer belt. Thereafter, the sheet is fixed by a fixing unit and discharged to the outside of the apparatus, whereby the printing operation is terminated.

EXAMPLES

Hereinafter, the present disclosure will be described based on Examples, but the technical scope of the present disclosure is not limited thereto.

Hereinafter, the charging member in the present disclosure was prepared using the following materials.

Elastic Layer Forming Material

NBR

NBR (1) (Trade name: JSR NBR N230SV, Acrylonitrile content: 35%, Mooney viscosity $ML_{(1+4)}$ 100° C.: 32, SP value: 20.0 $(J/cm^3)^{0.5}$, manufactured by JSR Corporation, Abbreviation: N230SV).

NBR (2) (Trade name: Nipol DN401LL, Acrylonitrile content: 18.0%, Mooney viscosity $ML_{(1+4)}$ 100° C.: 32, SP value: 17.4 $(J/cm^3)^{0.5}$, manufactured by Zeon Corporation, Abbreviation: DN401LL)

NBR (3) (Trade name: JSR NBR N215SL, Acrylonitrile content: 48%, Mooney viscosity $ML_{(1+4)}$ 100° C.: 45, SP value: 21.7 $(J/cm^3)^{0.5}$, manufactured by JSR Corporation, Abbreviation: N215SL)

SBR

SBR (1) (Trade name: Tufdene 2000R, Styrene content: 25%, Mooney viscosity $ML_{(1+4)}$ 100° C.: 45, SP value: 17.0 $(J/cm^3)^{0.5}$, manufactured by Asahi Kasei Corporation, Abbreviation: T2000R)

SBR (2) (Trade name: Tufdene 2003, Styrene content: 25%, Mooney viscosity $ML_{(1+4)}$ 100° C.: 33, SP value: 17.0 $(J/cm^3)^{0.5}$, manufactured by Asahi Kasei Corporation, Abbreviation: T2003)

EPDM

EPDM (Trade name: Esprene 505A, Mooney viscosity $ML_{(1+4)}$ 100° C.: 47, SP value: 16.0 $(J/cm^3)^{0.5}$, manufactured by Sumitomo Chemical Co., Ltd., Abbreviation: E505A)

Butadiene Rubber BR

Butadiene rubber (Trade name: UBEPOL BR130B, Mooney viscosity $ML_{(1+4)}$ 100° C.: 29, SP value: 16.8 $(J/cm^3)^{0.5}$, manufactured by Ube Corporation, Abbreviation: BR130B)

Isoprene Rubber IR

Isoprene rubber (Trade name: Nipol 2200L, Mooney viscosity $ML_{(1+4)}$ 100° C.: 70, SP value: 16.5 $(J/cm^3)^{0.5}$, manufactured by Zeon Corporation, Abbreviation: IR2200L)

Conductive Particles

Carbon black (1) (Trade name: TOKA BLACK #7270SB, DBP absorption amount: 62 $cm^3$/100 g, manufactured by Tokai Carbon Co., Ltd., Abbreviation: #7270)

Carbon black (2) (Trade name: TOKA BLACK #7360SB, DBP absorption amount: 87 $cm^3$/100 g, manufactured by Tokai Carbon Co., Ltd., Abbreviation: #7360)

Carbon black (3) (Trade name: TOKA BLACK #5500, DBP absorption amount: 155 $cm^3$/100 g, manufactured by Tokai Carbon Co., Ltd., Abbreviation: #5500)

Carbon black (4) (Trade name: Raven1170, DBP absorption amount: 55 $cm^3$/100 g, manufactured by Columbia Chemical, Abbreviation: R1170)

Carbon black (5) (Trade name: MA100, DBP absorption amount: 95 $cm^3$/100 g, manufactured by Mitsubishi Chemical Corporation, Abbreviation: MA100) Vulcanizing Agent Vulcanizing agent (Trade name: SULFAX PMC, Sulfur content: 97.5%, manufactured by Tsurumi Chemical Industry Co., Ltd., Abbreviation: sulfur)

Vulcanization Accelerator

Vulcanization accelerator (1) (Trade name: Sanceler TBZTD, tetrabenzylthiuram disulfide, manufactured by Sanshin Chemical Industry Co., Ltd., Abbreviation: TBzTD)

Vulcanization accelerator (2) (Trade name: SANTOCURE-TBSI, N-t-butyl-2-benzothiazolesulfenimide, manufactured by FLEXSYS, Abbreviation: TBSI)

Vulcanization accelerator (3) (Trade name: NOCCELER EP-60, vulcanization accelerator mixture, manufactured by OUCHI SHINKO CHEMICAL INDUSTRIAL CO., LTD., Abbreviation: EP-60)

Vulcanization accelerator (4) (Trade name: Nocceler TBT, tetrabutylthiuram disulfide, manufactured by Ouchi Shinko Chemical Industrial Co., Ltd., Abbreviation: TBT)

Filler

Filler (1) (Trade name: Nanox #30, calcium carbonate, manufactured by Maruo Calcium Co., Ltd., Abbreviation: #30).

Filler (2) (Thermax flow form N990, manufactured by CanCab, Abbreviation: MT)

Surface Layer Forming Material

A-1: Polyester polyol (Trade name: P2010, manufactured by Kuraray Co., Ltd.)

A-2: Polycarbonate polyol (Trade name: T5652, manufactured by Asahi Kasei Chemicals Corporation)

A-3: ε-caprolactone-modified polyol (Trade name: DC2016, manufactured by Daicel Corporation)

B-3: isocyanate A/isocyanate B=4:3 (Trade name: VESTANAT B1370, manufactured by Degussa AG/Trade name: DURANATE TPA-880E, manufactured by Asahi Kasei Chemicals Corporation)

C-1: Urethane particles (Trade name: DAIMIC BEADS UCN-5070D, Average particle diameter: 7.0 μm, manufactured by Dainichiseika Color & Chemicals Mfg. Co., Ltd.)

C-2: PMMA particles (Trade name: Ganzpearl GM0801, Average particle diameter: 8.0 μm, manufactured by Aica Kogyo Co., Ltd.)

CB: Conductive carbon black (Trade name: MA230, manufactured by Mitsubishi Chemical Corporation, Number average particle diameter: 30 nm)

D-1: Modified dimethyl silicone oil (Trade name: SH-28PA, manufactured by Dow Corning Toray Silicone Co., Ltd.)

Example 1

Preparation of Charging Roller 1

1-1. Preparation of Rubber Composition CMB for Domain Formation

The materials of the types and amounts shown in Table 1 were mixed with a pressure kneader to obtain a rubber composition CMB for domain formation.

The mixing conditions were a filling rate of 70 vol %, a blade rotation speed of 30 rpm, and 18 minutes.

TABLE 1

| | Name of raw material | Mixing amount (parts by mass) |
|---|---|---|
| Second rubber | SBR (Trade name: Tufdene 2000R, manufactured by Asahi Kasei Corporation) | 100 |
| Conductive particles | Carbon black (Trade name: TOKA BLACK #7270SB, manufactured by Tokai Carbon Co., Ltd.) | 70 |
| Vulcanization accelerator | Zinc oxide (Trade name: two types of zinc oxides, manufactured by Sakai Chemical Industry Co., Ltd.) | 5 |
| Processing aid | Zinc stearate (Trade name: SZ-2000, manufactured by Sakai Chemical Industry Co., Ltd.) | 2 |

1-2. Preparation of Rubber Composition for Matrix Formation (MRC)

The materials of the types and amounts shown in Table 2 were mixed with a pressure kneader to obtain a rubber composition for matrix formation (MRC).

The mixing conditions were a filling rate of 70 vol %, a blade rotation speed of 30 rpm, and 18 minutes.

TABLE 2

| | Name of raw material | Mixing amount (parts by mass) |
|---|---|---|
| First rubber | NBR (Trade name: N230SV, manufactured by JSR Corporation) | 100 |
| Filler | Calcium carbonate (Trade name: Nanox #30, manufactured by Maruo Calcium Co., Ltd.) | 40 |
| Vulcanization accelerator | Zinc oxide (Trade name: two types of zinc oxides, manufactured by Sakai Chemical Industry Co., Ltd.) | 5 |
| Processing aid | Zinc stearate (Trade name: SZ-2000, manufactured by Sakai Chemical Industry Co., Ltd.) | 2 |

1-3. Preparation of Rubber Composition 1 for Forming Elastic Layer

The materials of the types and amounts shown in Table 3 were mixed with an open roll to prepare a rubber composition 1 for forming an elastic layer. As a mixer, an open roll having a roll diameter of 12 inches was used.

As a mixing condition, the front roll rotation speed was 10 rpm, the rear roll rotation speed was 8 rpm, and the left and right cut-back were performed 20 times in total with a roll gap of 2 mm, and then the thin cutting was performed 10 times with a roll gap of 1.0 mm.

TABLE 3

| | Name of raw material | Mixing amount (parts by mass) |
|---|---|---|
| Domain raw material | Rubber composition CMB for domain formation in Table 1 | 25 |
| Matrix raw material | Rubber Composition MRC for Matrix Formation in Table 2 | 75 |
| Vulcanizing agent | Sulfur (Trade name: SULFAX PMC, Sulfur content: 97.5%, manufactured by Tsurumi Chemical Industry Co., Ltd.) | 3 |
| Vulcanization accelerator 1 | Tetrabenzylthiuram disulfide (Trade name: Sanceler TBzTD, manufactured by Sanshin Chemical Industry Co., Ltd.) | 1 |
| Vulcanization accelerator 2 | N-t-butyl-2-benzothiazolesulfenimide (Trade name: SANTOCURE-TBSI, manufactured by FLEXSYS) | 0.5 |

1-4. Molding of Conductive Elastic Roller 1

A round bar having a total length of 252 mm and an outer diameter of 6 mm was prepared by subjecting the surface of free-cutting steel to electroless nickel plating treatment. Next, using a roll coater, an adhesive (Trade name: Metaloc U-20, manufactured by Toyo Kagaku Kenkyusho Co., Ltd.) was applied over the entire circumference of a range of 230 mm excluding both end portions of the round bar by 11 mm to prepare a substrate.

Next, the substrate was coated with the rubber composition 1 for forming an elastic layer using a crosshead extrusion molding machine (manufactured by Mitsuba mfg Co., Ltd.) to prepare a crown-shaped unvulcanized rubber roller. A die having an inner diameter of 9.6 mm was attached to the tip of the crosshead. The molding temperature was set to 100° C. for each of the cylinder, the screw, and the crosshead.

The substrate was conveyed while changing the conveyance speed in order to form a crown shape, and the arithmetic average speed when molding one charging roller was adjusted to be 47 mm/sec. At the die outlet, the conductive rubber flows out at the same speed as the core metal, and thus the average flow rate at the time of molding one roller is 47 mm/sec, which is the same as the conveyance speed of the substrate.

The rotation speed of the screw was adjusted such that the outer diameter of the unvulcanized rubber roller was 9.8 mm at the longitudinal center with respect to the conveyance speed of the substrate. The molded unvulcanized rubber roller had a crown shape, and the outer diameter at the longitudinal center was 9.8 mm, and the outer diameter at a position of +90 mm from the longitudinal center position to both end portions was 9.7 mm.

Thereafter, the unvulcanized rubber roller was vulcanized by heating at a temperature of 160° C. for 60 minutes in an electric furnace, both end portions were cut, and the length of the electroconductive rubber formed in the axial direction was set to 232 mm to prepare the conductive elastic roller 1.

2-1. Preparation of Surface Layer Coating Liquid 1

A surface layer coating liquid 1 for forming the surface layer 1 was prepared as follows.

Under a nitrogen atmosphere, 100 parts by mass of polyester polyol (Trade name: P3010, manufactured by Kuraray Co., Ltd.) was gradually added dropwise to 27 parts by mass of polymeric MDI (Trade name: Millionate MR200, manufactured by Nippon Polyurethane Industry Co., Ltd.) in a reaction vessel while maintaining the temperature in the reaction vessel at 65° C. After termination of the dropwise addition, the mixture was reacted at a temperature of 65° C. for 2 hours. The obtained reaction mixture was cooled to room temperature to obtain an isocyanate group-terminated prepolymer P-1 having an isocyanate group content of 4.3%.

To 57.0 parts by mass of the isocyanate group-terminated prepolymer P-1, 43.0 parts by mass of a polyester polyol (Trade name: P2010, manufactured by Kuraray Co., Ltd.) and 23 parts by mass of carbon black (Trade name: MA230, manufactured by Mitsubishi Chemical Corporation, Number average particle diameter: 30 nm) were dissolved in methyl ethyl ketone (MEK) to adjust the solid content to 27 mass %. Thereafter, 0.1 parts by mass of modified dimethyl silicone oil (Trade name: SH-28PA, manufactured by Dow Corning Toray Silicone Co., Ltd.) was added to prepare a mixed liquid 1.

In a glass bottle having an internal volume of 450 mL, 270 g of the mixed liquid 1, and 200 g of glass beads having an average particle diameter of 0.8 mm were put, and dispersed for 12 hours using a paint shaker disperser. After dispersion, 15 parts by mass of urethane particles (Trade name: DAIMIC BEADS UCN-5070D, manufactured by Dainichiseika Color & Chemicals Mfg. Co., Ltd.) having an average particle diameter of 7.0 μm was added. Thereafter, the dispersion was further dispersed for 15 minutes, and the glass beads were removed to obtain a surface layer coating liquid 1.

3-1. Preparation of Charging Roller 1

The conductive elastic roller 1 was immersed (dipped) in the surface layer coating liquid 1 with the longitudinal direction thereof set to the vertical direction and the upper end portion thereof held, and then pulled up. The immersion time of the dipping coating was adjusted to 9 seconds, the pulling speed of the roller was adjusted such that the initial speed was 20 mm/sec and the final speed was 2 mm/sec, and the speed was linearly changed with respect to time between 20 mm/sec and 2 mm/sec.

After the application, it was air-dried at a temperature of 23° C. for 30 minutes. Subsequently, drying was performed at a temperature of 80° C. for 1 hour in a hot air current circulating dryer, and drying was performed at a temperature of 160° C. for 1 hour to form a dry film of the coating film of the surface layer coating liquid 1 on the elastic layer.

Furthermore, the surface of the dry film was irradiated with ultraviolet rays having a wavelength of 254 nm such that the integrated light amount was 9000 mJ/cm$^2$, and the outermost skin layer of the dry film was removed to form a surface layer in which conductive particles (conductive carbon black) in the dry film were exposed to the outer surface. As a light source of ultraviolet rays, a low pressure mercury lamp (manufactured by Toshiba Lighting & Technology Corporation) was used. In this manner, the charging roller 1 according to Example 1 was prepared.

4. Characteristics Evaluation

4-1. Impedance Measurement

The impedance was measured by the following measurement method.

First, as a pretreatment, while rotating the charging roller, which is an electrophotographic member, platinum was deposited on the outer surface of the charging roller to prepare a measurement electrode (metal film). At this time, an electrode having a width of 1.5 cm and being uniform in the circumferential direction was prepared using a masking tape. By forming the electrode, the contribution of the contact area between the measurement electrode and the electrophotographic member can be reduced as much as possible by the surface roughness of the electrophotographic member. Next, an aluminum sheet was wound around the electrode without any gap to form a measurement sample.

Then, an impedance measuring device (Trade name: Solartron 1260, 96 W, manufactured by Solartron Metrology) was connected from the aluminum sheet to the measurement electrode and to the substrate. The impedance was measured at a vibration voltage of 1 Vpp and a frequency of 1.0 Hz in an environment of a temperature of 23° C. and a relative humidity of 50% to obtain an absolute value of the impedance.

The charging roller (length in the longitudinal direction: 230 mm) was divided into 5 equal regions in the longitudinal direction, and measurement electrodes were formed at one point in each region, for a total of 5 points, and the above-described measurement was performed. The average value thereof was taken as the impedance of the charging roller.

The impedance of the charging roller 1 was $4.3\times10^5\Omega$.

4-2. Film Thickness Measurement of Surface Layer

The film thickness of the surface layer was measured by observing cross sections at a total of nine locations, three locations in the axial direction and three points in the circumferential direction of the surface layer with an optical microscope or an electron microscope, and the average value thereof was taken as the "film thickness" of the surface layer.

The film thickness of the surface layer of the charging roller 1 was 10 μm.

4-3. Measurement of Universal Hardness of Surface Layer

The universal hardness at a position of 1 μm in depth from the surface of the surface layer was measured with a universal hardness meter. For the measurement, an ultra-microhardness tester (Trade name: FISCHERSCOPE HM-2000, manufactured by Helmut Fischer GmbH) was used. Specific measurement conditions are shown below.

Measurement indenter: Vickers indenter (Surface angle 136, Young's modulus 1140, Poisson's ratio 0.07, Indenter material:diamond)

Measurement environment: temperature 23° C., relative humidity 50%

Maximum test load: 1.0 mN

Load condition: A load was applied in proportion to time at a speed to reach the maximum test load in 30 seconds. In this evaluation, the universal hardness was calculated by the following calculation formula (1) using the load F at the time when the indenter was pushed to a depth of 1 μm from the surface of the surface layer and the contact area A between the indenter and the surface layer at that time.

$$\text{Universal Hardness}(N/\text{mm}^2)=F/A \qquad \text{Calculation Formula (1):}$$

The universal hardness of the charging roller 1 was 3.2 N/mm$^2$.

4-4. Measurement of Volume Resistivity (22 cm) of Surface Layer

The volume resistivity of the surface layer was measured in a conductive mode using an atomic force microscope (AFM) (Trade name: Q-scope250, manufactured by Quesant). First, the surface layer of the charging roller was cut into a sheet having a width of 2 mm and a length of 2 mm using a manipulator, and platinum deposition was performed on one surface of the surface layer. Next, a direct current power supply (Trade name: 6614C, Agilent) was connected to the platinum deposited surface, 10 V was applied, and the free end of the cantilever was brought into contact with the other surface of the surface layer to obtain a current image through the AFM main body. This measurement was performed on the surface of randomly selected 100 locations in the entire surface layer, and the "volume resistivity" was calculated from the average current value of the top 10 locations of the low current values and the average value of the film thickness of the surface layer.

The measurement conditions are as follows.

Measurement mode: contact

Cantilever: CSC17

Measurement range: 10 μm×10 μm

Scan rate: 4 Hz

Applied voltage: 10 V

The volume resistivity of the surface layer of the charging roller 1 was $6.8\times10^{10}$ Ωcm.

4-5. Measurement of Protruded Portion Derived from Exposed Portion of Electronic Conductive Agent on Outer Surface of Surface Layer The method for measuring the number of protruded portions derived from the exposed portion of the electronic conductive agent on the surface of the surface layer is as follows. First, an elastic layer including a surface layer was cut out from the charging roller. Next, using a scanning probe microscope (SPM) (Product name: MFP-3D-Origin, manufactured by Aqualam Technologies, Inc.), tapping measurement was performed with a cantilever in a region of 2.0 μm long×2.0 μm wide to acquire a height image. The obtained height image was subjected to binarization processing using image processing software (Product name: Igor-Pro, manufactured by Hulinks Inc.) to extract protruded portions of 5 nm or more in the height image, and the number of convex portions was calculated. SPM height images were acquired at five locations, and the arithmetic mean value of the calculated number of particles that were protruded was taken as the number of fine protruded portions according to the present disclosure.

The measurement conditions are shown below.

Measurement mode: AM-FM mode tapping measurement

Cantilever: SI-DF3

Measurement range: 2 μm×2 μm

The number of minute protruded portions due to the exposure of the electronic conductive agent of the charging roller 1 was 210.

4-6. Calculation of Domain Ratio in Regions A and B in Elastic Layer

An observation section for calculating the domain ratios of the region A and the region B in the elastic layer was prepared by the following method.

Cross-sections parallel to the longitudinal direction of the charging roller and parallel to the outer surface were sectioned at intervals of 1 μm in thickness. The cross section was taken out using a microtome (Trade name: Leica EM FCS, manufactured by Leica Microsystems) at a cutting temperature of −100° C.

Among the sections prepared at intervals of 1 μm in the thickness direction by the above method, a first section (section A) obtained by switching from the surface layer to the elastic layer, and a section (section B) obtained by cutting out 5 μm further toward the elastic layer from the section A, were used. The surface of the section A on the elastic layer side is included in the region A. The section B is included in the region B. Platinum deposition was performed on the first surface included in the region A of the cut section A and the second surface included in the region B of the section B.

Next, a cross-sectional image was obtained by photographing at a magnification of 1000 using a scanning electron microscope (SEM) (Trade name: S-4800, manufactured by Hitachi High-Technologies Corporation). The obtained image was subjected to 8-bit grayscale using image analysis software (Product name: ImageProPlus, manufactured by Media Cybernetics, Inc.) to obtain a 256 gradation monochrome image. Next, the monochrome of the image was inverted such that the second phase in the monochrome image became white, and a binarization threshold was set on the brightness distribution of the image based on Otsu's discriminant analysis algorithm to obtain a binarized image.

A square having a side of 100 μm was cut out from the obtained binarized image, and the total area of the observation region (first observation region in section A and second observation region in section B) second phase was calculated. The total area of the second phase is the total area of the white regions of the binarized image. The area of the second phase calculated from the section A was defined as AR12, and the area of the second phase calculated from the section B was defined as AR22. AR11 and AR21 are the areas of the cut observation regions, and the area was calculated from a square having a side of 100 μm.

When the length of the elastic layer in the longitudinal direction was L, observation sections were prepared at 3 points of L1/4, L2/4, and L3/4, and the average value of the values at 3 points in total was taken as the values of AR12 and AR22.

The domain ratio AR12/AR11 in the region A of the charging roller 1 was 0.52, and the domain ratio AR22/AR21 in the region B was 0.24.

4-7. Determination of Matrix-Domain Structure (MD Structure) in Region B in Elastic Layer Determination was performed using the binarized image of the section B acquired in 4-6. above. Using the same image processing software as in 4-6. above and using the counting function of the software, with respect to the total number of domains existing in a 50 μm square region and having no contact with the frame line of the binarized image, the number percentage K of domains isolated without being connected to each other was calculated.

When the length of the elastic layer in the longitudinal direction was L, the observation sections were prepared at three points of L1/4, L2/4, and L3/4, and when the arithmetic mean value of K at the total three points was more than 80%, it was determined that the MD structure was "present", and when the arithmetic mean value was less than 80%, it was determined that the MD structure was "absent".

As for the region B of the charging roller 1, the matrix-domain structure was "present" as observed.

4-8. Measurement of Perimeter and Envelope Perimeter of Domain in Region B in Elastic Layer, and Number of Domains and Circle-Equivalent Diameter D Platinum deposition was performed on the cut plane using the section B prepared in 4-6. above. Next, a cross-sectional image was obtained by photographing at a magnification of 5000 using a scanning electron microscope (SEM) (Trade name: S-4800, manufactured by Hitachi High-Technologies Corporation). The obtained image was subjected to 8-bit grayscale using image analysis software (Product name: ImageProPlus, manufactured by Media Cybernetics, Inc.) to obtain a 256 gradation monochrome image. Next, the monochrome of the image was inverted such that the domain in the monochrome image became white, and a binarization threshold was set on the brightness distribution of the image based on Otsu's discriminant analysis algorithm to obtain a binarized image.

In the binarized image, a 15 μm square region was cut out, and the cross-sectional area, the perimeter, and the envelope perimeter were calculated using the counting function of image processing software.

For the domain cross-sectional area S calculated for each domain, the circle-equivalent diameter d of each domain was calculated by $d=(S/2\pi)^{0.5}$, and the number average value of d was calculated as the circle-equivalent diameter D of the domain.

A/B was calculated using the perimeter A and the envelope perimeter B calculated for each of the domains observed in each observation region, and the proportion (number %) of the domains in which (requirement) A/B was 1.00 to 1.10 among all the observed domains was obtained. In addition, the arithmetic mean diameter of domains and the number of domains in three observation regions were calculated from all the observed domains.

When the length of the elastic layer in the longitudinal direction was L, the observation sections were prepared at three points of L1/4, L2/4, and L3/4, and the average value of the values at the three points in total was taken as the ratio of domains in which A/B satisfied the requirements and the average value of A/B, respectively.

The ratio of domains in which A/B of the charging roller 1 was from 1.00 to 1.10 was 89%, and the arithmetic mean value of A/B was 1.06.

4-9. Volume Resistivity of Regions A and B in Elastic Layer and Volume Resistivity of Matrix in Region B The volume resistivity of the region A was calculated using the section A prepared in 4-6, and the volume resistivity of the region B was calculated using the section B.

Specifically, in an environment of a temperature of 23° C. and a relative humidity of 50%, the platinum-deposited surface from 4-6. was placed on the metal plate in a state of facing upwards, and a voltage of 50 V was applied between the metal plate and the platinum-deposited surface to measure a current value. The thickness of the section was set to 1 μm, and the volume resistivity was calculated from the thickness and the current value. Furthermore, when the length of the elastic layer in the longitudinal direction was L, the elastic layer was prepared at three locations of L1/4, L2/4, and L3/4, and the average value of the total three locations was taken as the volume resistivity of the region A and the region B. $\rho_B/\rho_A$ was calculated from the volume resistivity $\rho_A$ and $\rho_B$ of the region A.

Next, the volume resistivity of the matrix in the region B was measured by operating in a contact mode using a scanning probe microscope (SPM) (Trade name: Q-Scope 250, manufactured by Quesant Instrument Corporation).

First, the section B was obtained in the same manner as in 4-6. Next, in an environment of a temperature of 23° C. and a relative humidity of 50%, the section was installed on a metal plate, a location which is in direct contact with the metal plate was selected, and a cantilever of SPM was brought into contact with a location corresponding to the matrix. Next, a voltage of 50 V was applied to the cantilever, and a current value was measured.

The surface profile of the measurement section was observed with the SPM, and the thickness of the measurement location was calculated from the obtained height profile. The volume resistivity was calculated from the thickness and the current value to obtain the volume resistivity of the matrix.

Furthermore, when the length of the elastic layer in the longitudinal direction was L, the elastic layer was prepared at three locations of L1/4, L2/4, and L3/4, and the average value of the total three locations was taken as the volume resistivity of the matrix.

The volume resistivity ratio $\rho_B/\rho_A$ between the region A and the region B in the elastic layer of the charging roller 1 was 11.2. The volume resistivity of the matrix was $2.7\times10^8$ Ωcm.

4-10. Calculation of Ratio $S_c/S$ of Cross-Sectional Area of Conductive Particle Included in Domain to Cross-Sectional Area of Domain Using the platinum-deposited section B prepared in 4-6. above, a cross-sectional image was obtained by photographing at 20,000 magnifications using a scanning electron microscope (SEM) (Trade name: S-4800, manufactured by Hitachi High-Technologies Corporation). Next, binarization was performed using image analysis software (Product name: ImageProPlus, manufactured by Media Cybernetics, Inc.) such that carbon black in the domain can be distinguished. Furthermore, an observation region having a size in which one domain is accommodated was extracted from the obtained binarized image, the cross-sectional area S of the domain and the cross-sectional area Sc of carbon black as the conductive particles comprised in the domain were calculated by using the count function, and the cross-sectional area ratio of the conductive particles in the domain was calculated by $S_c/S$.

The $S_c/S$ of the charging roller 1 was 26.7%.

5. Evaluation as Charging Member

5-1. Measurement of Injected Charge Amount of Toner

The ability of the charging roller 1 to supply negative charges to soiling components (soiling components such as transfer residual toner and external additives) was evaluated as follows.

A laser printer (Trade name: HP LaserJet Pro M203dw, manufactured by HP) was prepared as an electrophotographic image forming apparatus. Then, the motor of this laser printer was modified such that the process speed was 1.4 times the normal speed. Furthermore, an external power supply was connected to apply voltage to the charging roller, and modifications were made to ensure that the voltage was not directly applied to the charging roller from the main unit. In addition, for the process cartridge for the laser printer, the cleaning blade of the charging roller and the developer container which is in contact with the photosensitive drum were removed. The transfer roller of the laser printer main body was also removed.

The laser printer and the process cartridge were allowed to stand in a low-temperature and low-humidity (temperature: 15° C., relative humidity: 10%) environment for 48 hours. The process cartridge was then loaded into the laser printer. Then, the following evaluation was performed under a low temperature and low humidity environment. In a low temperature and low humidity environment, charge injection from the charging roller to the toner hardly occurs. By performing the following evaluation under such an environment, the charge injection capability to the charging roller can be more accurately evaluated.

First, the main body was stopped in the middle of an image forming process of outputting one solid black image under a normal image output condition, and a state where the entire circumference of the photosensitive drum was covered with the toner layer was formed.

Next, the process cartridge in a state where the entire circumference of the photosensitive drum was covered with the toner layer was taken out from the main body. The charging roller of the process cartridge was removed, the charging roller 1 was attached as a charging roller, and the process cartridge was attached to the main body.

Then, an image process of applying a voltage at which the charging roller did not discharge, specifically, −500 V from an external power supply to the charging roller 1 to output one solid white image was performed, and in the process, the potential of the toner on the surface of the toner layer on the photosensitive drum before and after passing through the nip part between the charging roller and the photosensitive drum was measured. For the measurement of the potential, a surface electrometer probe (Trade name: MODEL555P-1, manufactured by Trek Japan Co., Ltd.) disposed at a position 2 mm away from the surface of the photosensitive drum was used.

The difference between the surface potential of the toner layer before passing through the nip portion and the surface potential of the toner layer after passing through the nip portion was measured as the injected charge amount (V) into the toner by the charging roller.

The injected charge amount to the toner by the charging roller 1 was −20.4 V.

5-2. Measurement of Soiling Amount (Toner Coloring Density)

In order to evaluate the soiling adhesion amount of the charging roller 1, the following evaluation was performed.

A laser printer (Trade name: HP LaserJet Pro M203dw, manufactured by HP) was prepared as an electrophotographic image forming apparatus. Then, the motor of this laser printer was modified such that the process speed was 1.4 times the normal speed. Furthermore, an external power supply was connected to apply voltage to the charging roller, and modifications were made to ensure that the voltage was not directly applied to the charging roller from the main unit. In addition, for the process cartridge for this laser printer, the cleaning blade of the charging roller was removed. The evaluation environment was the same as in 5-1. above.

First, 500 sheets of images were output in which horizontal lines with a width of 2 dots and an interval of 100 dots were drawn in the direction perpendicular to the rotation direction of the photosensitive drum, the charging roller 1 was removed from the process cartridge, and the degree of soiling was evaluated by tape coloring evaluation. The tape coloring evaluation was performed as follows.

A polyester adhesive tape (Trade name: No. 31B, manufactured by Nitto Denko Corporation) was attached to the surface of the charging roller, and then the adhesive tape was peeled off together with the toner attached to the surface of the charging roller and attached to white paper. This was performed for the entire image printing region on the surface of the charging roller, and then the reflection density of the adhesive tape was measured for the entire image printing region by a photovolt reflection densitometer (Trade name: TC-6DS/A, manufactured by Tokyo Denshoku Co., Ltd.) to obtain the maximum value. Next, the reflection density of a new polyester adhesive tape similarly attached to white paper was measured to obtain a minimum value, and an increase in the reflection density was taken as a value of the coloring density. As the value of the coloring density is smaller, the soiling amount on the charging roller is smaller and better, and thus the index of the degree of soiling on the charging roller was used.

The toner coloring density of the charging roller 1 was 24%.

5-3. Image Evaluation

In the same main body and cartridge configuration as in 5-2. above, under a low temperature and low humidity (temperature: 15° C., relative humidity: 10%) environment, 20,000 sheets of images were output in which characters of the alphabet "E" having a size of 4 points were printed on A4 size paper at a print percentage of 1%. Note that the output of the electrophotographic image was performed in a so-called intermittent mode in which the rotation of the electrophotographic photosensitive member was stopped for 7 seconds each time one sheet was output. In the image output in the intermittent mode, the number of times of rubbing between the charging roller and the electrophotographic photosensitive member increases as compared with the case of continuously outputting the electrophotographic image, and thus, it can be said that the image output in the intermittent mode is a more severe evaluation condition for the charging roller.

Next, a halftone image (an image in which a horizontal line having a width of 1 dot and an interval of 2 dots is drawn in a direction perpendicular to the rotation direction of the photosensitive drum) was output, and the obtained image was observed visually and using a magnifying lens and evaluated according to the following criteria.

Rank A: No white spots were observed even when checked with a magnifying lens.

Rank B: No white spots were visually observed.

Rank C: Slight white spots are visually observed.

Rank D: White spots are visually observed over the entire area.

White spots were not visually recognized in the halftone image using the charging roller 1.

Examples 2 to 22

Charging rollers 2 to 22 were prepared in a similar manner to Example 1 except that the elastic layer and the surface layer were formed under the conditions shown in Table 8. As for the formulation of the rubber composition for forming an elastic layer in each elastic layer of No. described in Table 8, CMB was manufactured in the formulation shown in Table 4, MRC was manufactured in the formulation shown in Table 5, and the rubber composition for forming an elastic layer was manufactured in the formulation shown in Table 6. In addition, a surface layer coating liquid was manufactured in the formulation shown in Table 7. The number of parts in each table indicates the number of parts by mass.

Comparative Example 1

A rubber composition 20 for forming an elastic layer was prepared by changing the CMB to the blend shown in Table 4, the MRC to the blend shown in Table 5, and the conductive rubber composition to the blend shown in Table 6. Thereafter, the substrate was coated with the rubber composition 20 for forming an elastic layer using the same substrate as used in Example 1. Detailed conditions are as follows.

Using a crosshead extruder (manufactured by Mitsuba Manufacturing Co., Ltd.), the conductive rubber composition 20 was coated to prepare a crown-shaped unvulcanized rubber roller. A die having an inner diameter of 10.5 mm was attached to the tip of the crosshead. The molding temperature was set to 100° C. for each of the cylinder, the screw, and the crosshead. The conveyance speed of the substrate was adjusted to 60 mm/sec. At the die outlet, the conductive rubber flows out at the same speed as the core metal, and thus the flow rate of a conductive rubber composition 1' at the die outlet is 60 mm/sec, which is the same as the conveyance speed of the substrate. The rotation speed of the screw was adjusted such that the outer diameter of the unvulcanized rubber roller was 10.3 mm at the longitudinal center with respect to the conveyance speed of the substrate.

Next, the unvulcanized rubber roller was vulcanized by heating at a temperature of 160° C. for 60 minutes in an electric furnace, both end portions were cut, and the length of the electroconductive rubber formed in the axial direction was set to 232 mm.

Thereafter, the surface of the conductive rubber layer was polished by rotary polishing. As a result, the conductive roller 20 comprising the elastic layer 20 having a diameter of 9.7 mm at the center portion in the longitudinal direction and having a diameter of 9.65 mm at each position of 90 mm from the center portion toward both end portions was obtained.

Finally, a surface layer was formed and UV treatment was performed in the same manner as in Example 1, thereby obtaining the charging roller 23. The evaluation results are shown in Tables 8 to 10.

Comparative Examples 2 and 3

The charging rollers 24 and 25 were prepared in the same manner as in Comparative Example 1 except that the blend of CMB was changed as shown in Table 4, the blend of MRC was changed as shown in Table 5, and the blend of the rubber composition for forming an elastic layer was changed as shown in Table 6. The evaluation results are shown in Tables 8 to 10.

Table 4 shows the blend of the CMB.

TABLE 4

| Elastic layer No. | Second rubber | | | | | Conductive particles | | | Zinc oxide | Zinc stearate |
|---|---|---|---|---|---|---|---|---|---|---|
| | Rubber type | Grade | Mooney viscosity | SP value | Number of parts | Abbreviation | DBP absorption amount | Number of parts | Number of parts | Number of parts |
| 1 | SBR | T2000R | 45 | 17.0 | 100 | #7270 | 62 | 70 | 5 | 2 |
| 2 | SBR | T2000R | 45 | 17.0 | 100 | #7270 | 62 | 90 | 5 | 2 |
| 3 | SBR | T2000R | 45 | 17.0 | 100 | #7270 | 62 | 70 | 5 | 2 |
| 4 | SBR | T2000R | 45 | 17.0 | 100 | #7270 | 62 | 70 | 5 | 2 |
| 5 | SBR | T2000R | 45 | 17.0 | 100 | #7270 | 62 | 70 | 5 | 2 |
| 6 | SBR | T2000R | 45 | 17.0 | 100 | #7270 | 62 | 70 | 5 | 2 |
| 7 | SBR | T2000R | 45 | 17.0 | 100 | #7270 | 62 | 70 | 5 | 2 |
| 8 | NBR | N230SV | 32 | 20.0 | 100 | #7270 | 62 | 70 | 5 | 2 |
| 9 | NBR | DN401LL | 32 | 17.4 | 100 | #7270 | 62 | 70 | 5 | 2 |
| 10 | NBR | N215SL | 45 | 21.7 | 100 | #7270 | 62 | 70 | 5 | 2 |
| 11 | EPDM | E505A | 47 | 16.0 | 100 | #7270 | 62 | 70 | 5 | 2 |
| 12 | EPDM | E505A | 47 | 16.0 | 100 | #7270 | 62 | 70 | 5 | 2 |
| 13 | EPDM | E505A | 47 | 16.0 | 100 | #7270 | 62 | 70 | 5 | 2 |
| 14 | IR | IR2200L | 70 | 16.5 | 100 | #7270 | 62 | 70 | 5 | 2 |
| 15 | NBR | DN401LL | 32 | 17.4 | 100 | #7270 | 62 | 70 | 5 | 2 |
| 16 | NBR | DN401LL | 32 | 17.4 | 100 | Raven1170 | 55 | 60 | 5 | 2 |
| 17 | NBR | DN401LL | 32 | 17.4 | 100 | #7360 | 87 | 60 | 5 | 2 |
| 18 | NBR | DN401LL | 32 | 17.4 | 100 | MA100 | 95 | 60 | 5 | 2 |
| 19 | NBR | DN401LL | 32 | 17.4 | 100 | #5500 | 155 | 60 | 5 | 2 |
| 20 | NBR | DN401LL | 32 | 17.4 | 100 | #7270 | 62 | 70 | 5 | 2 |
| 21 | BR | 150B | 40 | 16.8 | 100 | #7270 | 62 | 70 | 5 | 2 |
| 22 | EPDM | E505A | 47 | 16.0 | 100 | #7270 | 62 | 70 | 5 | 2 |

Table 5 shows the blend of the MRC.

TABLE 5

| Elastic layer No. | First rubber | | | | | Filler | | Zinc oxide | Zinc stearate |
|---|---|---|---|---|---|---|---|---|---|
| | Rubber type | Grade | Mooney viscosity | SP value | Number of parts | Abbreviation | Number of parts | Number of parts | Number of parts |
| 1 | NBR | N230SV | 32 | 20.0 | 100 | #30 | 40 | 5 | 2 |
| 2 | NBR | N230SV | 32 | 20.0 | 100 | #30 | 40 | 5 | 2 |
| 3 | NBR | N230SV | 32 | 20.0 | 100 | #30 | 20 | 5 | 2 |
| | | | | | | MT | 30 | | |
| 4 | NBR | DN401LL | 32 | 17.4 | 100 | #30 | 40 | 5 | 2 |
| 5 | NBR | DN401LL | 32 | 17.4 | 100 | #30 | 40 | 5 | 2 |
| 6 | NBR | DN401LL | 32 | 17.4 | 100 | #30 | 40 | 5 | 2 |
| 7 | NBR | N215SL | 45 | 21.7 | 100 | #30 | 40 | 5 | 2 |
| 8 | SBR | T2003 | 33 | 17.0 | 100 | #30 | 40 | 5 | 2 |
| 9 | SBR | T2003 | 33 | 17.0 | 100 | #30 | 40 | 5 | 2 |
| 10 | SBR | T2003 | 33 | 17.0 | 100 | #30 | 40 | 5 | 2 |
| 11 | NBR | DN401LL | 32 | 17.4 | 100 | #30 | 40 | 5 | 2 |
| 12 | NBR | N215SL | 45 | 21.7 | 100 | #30 | 40 | 5 | 2 |
| 13 | SBR | T2003 | 33 | 17.0 | 100 | #30 | 40 | 5 | 2 |
| 14 | NBR | DN401LL | 32 | 17.4 | 100 | #30 | 40 | 5 | 2 |

TABLE 5-continued

| Elastic layer No. | First rubber Rubber type | Grade | Mooney viscosity | SP value | Number of parts | Filler Abbreviation | Number of parts | Zinc oxide Number of parts | Zinc stearate Number of parts |
|---|---|---|---|---|---|---|---|---|---|
| 15 | BR | 150B | 40 | 16.8 | 100 | #30 | 40 | 5 | 2 |
| 16 | BR | 150B | 40 | 16.8 | 100 | #30 | 40 | 5 | 2 |
| 17 | BR | 150B | 40 | 16.8 | 100 | #30 | 40 | 5 | 2 |
| 18 | BR | 150B | 40 | 16.8 | 100 | #30 | 40 | 5 | 2 |
| 19 | BR | 150B | 40 | 16.8 | 100 | #30 | 40 | 5 | 2 |
| 20 | SBR | T2003 | 33 | 17.0 | 100 | #30 | 40 | 5 | 2 |
| 21 | IR | IR2200L | 70 | 16.5 | 100 | #30 | 40 | 5 | 2 |
| 22 | NBR | DN401LL | 32 | 17.4 | 100 | #30 | 40 | 5 | 2 |

TABLE 6

| Elastic layer No. | MRC Number of parts | CMB Number of parts | SP value difference | Vulcanizing agent Material name | Number of parts | Vulcanization accelerator 1 Abbreviation | Number of parts | Vulcanization accelerator 2 Abbreviation | Number of parts |
|---|---|---|---|---|---|---|---|---|---|
| 1 | 75 | 25 | 3.0 | Sulfur | 3 | TBzTD | 1.0 | TBSI | 0.5 |
| 2 | 75 | 25 | 3.0 | Sulfur | 3 | TBzTD | 1.0 | TBSI | 0.5 |
| 3 | 75 | 25 | 3.0 | Sulfur | 3 | TBzTD | 1.0 | TBSI | 0.5 |
| 4 | 75 | 25 | 0.4 | Sulfur | 3 | TBzTD | 1.0 | TBSI | 0.5 |
| 5 | 60 | 40 | 0.4 | Sulfur | 3 | TBzTD | 1.0 | TBSI | 0.5 |
| 6 | 60 | 40 | 0.4 | Sulfur | 3 | TBzTD | 1.0 | TBSI | 0.5 |
| 7 | 75 | 25 | 4.7 | Sulfur | 3 | TBzTD | 1.0 | TBSI | 0.5 |
| 8 | 75 | 25 | 3.0 | Sulfur | 3 | TBzTD | 1.0 | TBSI | 0.5 |
| 9 | 75 | 25 | 0.4 | Sulfur | 3 | TBzTD | 1.0 | TBSI | 0.5 |
| 10 | 75 | 25 | 4.7 | Sulfur | 3 | TBzTD | 1.0 | TBSI | 0.5 |
| 11 | 75 | 25 | 1.4 | Sulfur | 3 | EP-60 | 4.5 | — | — |
| 12 | 75 | 25 | 5.7 | Sulfur | 3 | EP-60 | 4.5 | — | — |
| 13 | 75 | 25 | 1.0 | Sulfur | 3 | EP-60 | 4.5 | — | — |
| 14 | 75 | 25 | 0.9 | Sulfur | 3 | TBT | 1.0 | TBSI | 0.5 |
| 15 | 75 | 25 | 0.6 | Sulfur | 3 | TBzTD | 1.0 | TBSI | 0.5 |
| 16 | 75 | 25 | 0.6 | Sulfur | 3 | TBzTD | 1.0 | TBSI | 0.5 |
| 17 | 75 | 25 | 0.6 | Sulfur | 3 | TBzTD | 1.0 | TBSI | 0.5 |
| 18 | 75 | 25 | 0.6 | Sulfur | 3 | TBzTD | 1.0 | TBSI | 0.5 |
| 19 | 75 | 25 | 0.6 | Sulfur | 3 | TBzTD | 1.0 | TBSI | 0.5 |
| 20 | 75 | 25 | 0.4 | Sulfur | 3 | TBzTD | 1.0 | TBSI | 0.5 |
| 21 | 65 | 35 | 0.3 | Sulfur | 3 | TBzTD | 1.0 | TBSI | 0.5 |
| 22 | 75 | 25 | 1.4 | Sulfur | 3 | EP-60 | 4.5 | — | — |

TABLE 7

| Coating liquid No. | Polyol | Isocyanate | Amount ratio (polyol/isocyanate) | Conductive agent Type | Number of parts | Roughening particles Type | Number of parts | Silicone additive Grade | Number of parts |
|---|---|---|---|---|---|---|---|---|---|
| 1 | A-1 | P-1 | 43/57 | CE | 23 | C-1 | 15 | D-1 | 0.1 |
| 2 | A-2 | P-1 | 46/54 | CB | 23 | C-1 | 15 | D-1 | 0.1 |
| 3 | A-3 | B-3 | 41/59 | CB | 23 | C-2 | 15 | D-1 | 0.1 |

TABLE 8

| | Charging roller No. | Elastic layer No. | Surface layer coating liquid No. | UV treatment | Extrusion molding Die diameter [mm] | Flow rate of rubber in die outlet [mm/sec] |
|---|---|---|---|---|---|---|
| Example 1 | 1 | 1 | 1 | Present | 9.6 | 47 |
| Example 2 | 2 | 1 | 2 | Present | 9.6 | 47 |
| Example 3 | 3 | 1 | 3 | Present | 9.6 | 47 |
| Example 4 | 4 | 2 | 2 | Present | 9.6 | 47 |
| Example 5 | 5 | 3 | 2 | Present | 9.6 | 47 |

TABLE 8-continued

| | | | | | | |
|---|---|---|---|---|---|---|
| Example 6 | 6 | 4 | 2 | Present | 9.6 | 47 |
| Example 7 | 7 | 5 | 2 | Present | 9.6 | 47 |
| Example 8 | 8 | 6 | 2 | Present | 9.4 | 63 |
| Example 9 | 9 | 7 | 2 | Present | 9.6 | 47 |
| Example 10 | 10 | 8 | 2 | Present | 9.6 | 47 |
| Example 11 | 11 | 9 | 2 | Present | 9.6 | 47 |
| Example 12 | 12 | 10 | 2 | Present | 9.6 | 47 |
| Example 13 | 13 | 11 | 2 | Present | 9.6 | 47 |
| Example 14 | 14 | 12 | 2 | Present | 9.6 | 47 |
| Example 15 | 15 | 13 | 2 | Present | 9.6 | 47 |
| Example 16 | 16 | 14 | 2 | Present | 9.6 | 47 |
| Example 17 | 17 | 15 | 2 | Present | 9.6 | 47 |
| Example 18 | 18 | 16 | 2 | Present | 9.6 | 47 |
| Example 19 | 19 | 17 | 2 | Present | 9.6 | 47 |
| Example 20 | 20 | 18 | 2 | Present | 9.6 | 47 |
| Example 21 | 21 | 19 | 2 | Present | 9.6 | 47 |
| Example 22 | 22 | 15 | 2 | Absent | 9.6 | 47 |
| Comparative Example 1 | 23 | 20 | 1 | Present | 10.3 | 60 |
| Comparative Example 2 | 24 | 21 | 1 | Present | 10.3 | 60 |
| Comparative Example 3 | 25 | 22 | 1 | Present | 10.3 | 60 |

| | | | Surface layer | | | |
|---|---|---|---|---|---|---|
| | Polishing process | Impedance [Ω] | Film thickness of surface layer [μm] | Universal hardness [N/mm²] | Volume resistivity of surface layer [Ωcm] | Number of minute protruded portion [number] |
| Example 1 | Absent | $4.3 \times 10^5$ | 10 | 3.2 | $6.8 \times 10^{10}$ | 210 |
| Example 2 | Absent | $6.0 \times 10^5$ | 10 | 2.9 | $6.5 \times 10^{10}$ | 265 |
| Example 3 | Absent | $2.3 \times 10^5$ | 10 | 25.5 | $6.5 \times 10^{12}$ | 186 |
| Example 4 | Absent | $4.4 \times 10^4$ | 10 | 2.9 | $6.5 \times 10^{10}$ | 265 |
| Example 5 | Absent | $3.1 \times 10^5$ | 10 | 2.9 | $6.5 \times 10^{10}$ | 265 |
| Example 6 | Absent | $1.1 \times 10^6$ | 10 | 2.9 | $6.5 \times 10^{10}$ | 265 |
| Example 7 | Absent | $5.5 \times 10^4$ | 10 | 2.9 | $6.5 \times 10^{10}$ | 265 |
| Example 8 | Absent | $2.9 \times 10^4$ | 10 | 2.9 | $6.5 \times 10^{10}$ | 265 |
| Example 9 | Absent | $6.6 \times 10^4$ | 10 | 2.9 | $6.5 \times 10^{10}$ | 265 |
| Example 10 | Absent | $7.4 \times 10^5$ | 10 | 2.9 | $6.5 \times 10^{10}$ | 265 |
| Example 11 | Absent | $9.9 \times 10^6$ | 10 | 2.9 | $6.5 \times 10^{10}$ | 265 |
| Example 12 | Absent | $1.1 \times 10^5$ | 10 | 2.9 | $6.5 \times 10^{10}$ | 265 |
| Example 13 | Absent | $1.3 \times 10^4$ | 10 | 2.9 | $6.5 \times 10^{10}$ | 265 |
| Example 14 | Absent | $4.7 \times 10^4$ | 10 | 2.9 | $6.5 \times 10^{10}$ | 265 |
| Example 15 | Absent | $1.5 \times 10^5$ | 10 | 2.9 | $6.5 \times 10^{10}$ | 265 |
| Example 16 | Absent | $7.8 \times 10^4$ | 10 | 2.9 | $6.5 \times 10^{10}$ | 265 |
| Example 17 | Absent | $3.3 \times 10^6$ | 10 | 2.9 | $6.5 \times 10^{10}$ | 265 |
| Example 18 | Absent | $4.14 \times 10^4$ | 10 | 2.9 | $6.5 \times 10^{10}$ | 265 |
| Example 19 | Absent | $4.32 \times 10^5$ | 10 | 2.9 | $6.5 \times 10^{10}$ | 265 |
| Example 20 | Absent | $1.31 \times 10^5$ | 10 | 2.9 | $6.5 \times 10^{10}$ | 265 |
| Example 21 | Absent | $2.30 \times 10^3$ | 10 | 2.9 | $6.5 \times 10^{10}$ | 265 |
| Example 22 | Absent | $3.3 \times 10^6$ | 10 | 2.9 | $6.5 \times 10^{10}$ | 0 |
| Comparative Example 1 | Present | $7.43 \times 10^5$ | 20 | 3.2 | $6.8 \times 10^{10}$ | 210 |
| Comparative Example 2 | Present | $8.66 \times 10^6$ | 20 | 3.2 | $6.8 \times 10^{10}$ | 210 |
| Comparative Example 3 | Present | $7.60 \times 10^5$ | 20 | 3.2 | $6.8 \times 10^{10}$ | 210 |

TABLE 9

| | | Elastic layer | | | | | | | | | | |
|---|---|---|---|---|---|---|---|---|---|---|---|---|
| | Charging roller No. | Region A AR12/AR11 | Region B AR22/AR21 | MD structure of region B | Number of domains | A/B Number % | Domain circle-equivalent diameter [μm] | Average value of A/B | $\rho_B/\rho_A$ | Matrix volume resistivity [Ωcm] | $S_c/S$ [%] | Thickness [mm] |
| Example 1 | 1 | 0.52 | 0.24 | Present | 56 | 89 | 1.0 | 1.06 | 11.2 | $2.7 \times 10^8$ | 26.7 | 1.9 |
| Example 2 | 2 | 0.52 | 0.24 | Present | 57 | 89 | 0.9 | 1.06 | 11.2 | $3.3 \times 10^8$ | 26.7 | 1.9 |
| Example 3 | 3 | 0.52 | 0.24 | Present | 55 | 89 | 1.0 | 1.06 | 11.2 | $2.9 \times 10^8$ | 26.7 | 1.9 |
| Example 4 | 4 | 0.53 | 0.24 | Present | 50 | 91 | 1.1 | 1.04 | 16.5 | $3.1 \times 10^8$ | 32.7 | 1.9 |
| Example 5 | 5 | 0.51 | 0.24 | Present | 52 | 89 | 0.9 | 1.06 | 12.3 | $1.9 \times 10^8$ | 26.7 | 1.9 |

TABLE 9-continued

| | Charging roller No. | Elastic layer Region A AR12/ AR11 | Region B AR22/ AR21 | MD structure of region B | Number of domains | A/B Number % | Domain circle-equivalent diameter [μm] | Average value of A/B | $\rho_B/\rho_A$ | Matrix volume resistivity [Ωcm] | $S_c/S$ [%] | Thickness [mm] |
|---|---|---|---|---|---|---|---|---|---|---|---|---|
| Example 6 | 6 | 0.60 | 0.24 | Present | 60 | 95 | 0.9 | 1.02 | 36.1 | $1.2 \times 10^{8}$ | 26.7 | 1.9 |
| Example 7 | 7 | 0.68 | 0.38 | Present | 162 | 93 | 0.6 | 1.03 | 42.2 | $1.9 \times 10^{8}$ | 26.7 | 1.9 |
| Example 8 | 8 | 0.74 | 0.38 | Present | 290 | 93 | 0.5 | 1.03 | 88.4 | $1.0 \times 10^{8}$ | 26.7 | 1.9 |
| Example 9 | 9 | 0.46 | 0.24 | Present | 298 | 84 | 0.5 | 1.08 | 8.1 | $4.8 \times 10^{8}$ | 26.7 | 1.9 |
| Example 10 | 10 | 0.52 | 0.24 | Present | 38 | 89 | 1.2 | 1.06 | 12.3 | $8.3 \times 10^{13}$ | 28.0 | 1.9 |
| Example 11 | 11 | 0.63 | 0.24 | Present | 60 | 89 | 1.0 | 1.06 | 44.4 | $9.9 \times 10^{13}$ | 28.6 | 1.9 |
| Example 12 | 12 | 0.44 | 0.24 | Present | 150 | 84 | 0.7 | 1.08 | 8.1 | $7.4 \times 10^{13}$ | 26.5 | 1.9 |
| Example 13 | 13 | 0.58 | 0.24 | Present | 40 | 89 | 1.3 | 1.06 | 24.2 | $2.2 \times 10^{8}$ | 27.7 | 1.9 |
| Example 14 | 14 | 0.41 | 0.24 | Present | 92 | 81 | 0.8 | 1.09 | 6.1 | $5.5 \times 10^{8}$ | 27.7 | 1.9 |
| Example 15 | 15 | 0.55 | 0.24 | Present | 22 | 90 | 1.6 | 1.05 | 20.7 | $6.9 \times 10^{13}$ | 27.7 | 1.9 |
| Example 16 | 16 | 0.56 | 0.24 | Present | 115 | 90 | 0.7 | 1.05 | 22.6 | $2.3 \times 10^{8}$ | 25.5 | 1.9 |
| Example 17 | 17 | 0.55 | 0.24 | Present | 123 | 91 | 0.7 | 1.04 | 22.6 | $3.1 \times 10^{15}$ | 27.4 | 1.9 |
| Example 18 | 18 | 0.55 | 0.24 | Present | 134 | 91 | 0.6 | 1.04 | 24.1 | $3.3 \times 10^{15}$ | 27.0 | 1.9 |
| Example 19 | 19 | 0.55 | 0.24 | Present | 140 | 90 | 0.6 | 1.05 | 26.2 | $2.5 \times 10^{15}$ | 27.6 | 1.9 |
| Example 20 | 20 | 0.55 | 0.24 | Present | 126 | 86 | 0.7 | 1.07 | 29.9 | $4.4 \times 10^{15}$ | 28.2 | 1.9 |
| Example 21 | 21 | 0.55 | 0.24 | Present | 120 | 83 | 0.6 | 1.08 | 36.3 | $3.6 \times 10^{15}$ | 28.6 | 1.9 |
| Example 22 | 22 | 0.55 | 0.24 | Present | 143 | 91 | 0.6 | 1.04 | 22.5 | $3.1 \times 10^{15}$ | 27.4 | 1.9 |
| Comparative Example 1 | 23 | 0.25 | 0.24 | Present | 175 | 97 | 0.5 | 1.02 | 1.1 | $1.1 \times 10^{14}$ | 28.0 | 1.9 |
| Comparative Example 2 | 24 | 0.35 | 0.34 | Present | 188 | 96 | 0.7 | 1.02 | 1.2 | $8.9 \times 10^{15}$ | 26.3 | 1.9 |
| Comparative Example 3 | 25 | 0.25 | 0.24 | Present | 86 | 93 | 0.9 | 1.06 | 1.1 | $5.0 \times 10^{8}$ | 26.0 | 1.9 |

In the table, the "number of domains" is an average value of the number of domains in an observation region of 15 μm square placed in the region B. The "A/B number %" indicates a number ratio of domains in which the value of A/B is 1.00 to 1.10.

TABLE 10

| | Charging roller No. | Evaluation as charging member Injected charge amount of toner [V] | Toner coloring density [%] | Image evaluation rank |
|---|---|---|---|---|
| Example 1 | 1 | −20.4 | 24 | B |
| Example 2 | 2 | −22.0 | 21 | B |
| Example 3 | 3 | −19.4 | 33 | B |
| Example 4 | 4 | −23.5 | 18 | B |
| Example 5 | 5 | −21.4 | 20 | B |
| Example 6 | 6 | −28.8 | 10 | A |
| Example 7 | 7 | −30.2 | 8 | A |
| Example 8 | 8 | −33.6 | 5 | A |
| Example 9 | 9 | −12.4 | 38 | C |
| Example 10 | 10 | −21.8 | 20 | B |
| Example 11 | 11 | −29.6 | 7 | A |
| Example 12 | 12 | −10.4 | 41 | C |
| Example 13 | 13 | −25.2 | 16 | B |
| Example 14 | 14 | −8.8 | 46 | C |
| Example 15 | 15 | −24.4 | 17 | B |
| Example 16 | 16 | −24.7 | 16 | B |
| Example 17 | 17 | −25.4 | 15 | B |
| Example 18 | 18 | −26.3 | 14 | B |
| Example 19 | 19 | −25.1 | 18 | B |
| Example 20 | 20 | −25.8 | 15 | B |
| Example 21 | 21 | −27.0 | 13 | B |
| Example 22 | 22 | −12.8 | 39 | C |
| Comparative Example 1 | 23 | −2.1 | 61 | D |
| Comparative Example 2 | 24 | −4.3 | 54 | D |
| Comparative Example 3 | 25 | −1.4 | 68 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166398, filed Sep. 27, 2023, which is hereby incorporated by reference herein in its entirety.

What is claimed is:

1. An electrophotographic member comprising:

a substrate having a conductive surface;

an elastic layer on the conductive surface of the substrate; and a surface layer which is in contact with a surface of the elastic layer on an opposite side to a surface that faces the substrate, wherein the surface layer comprises an electronic conductive agent, a metal film is provided on an outer surface of the surface layer of the electrophotographic member, and in an environment with a temperature of 23° C. and a relative humidity of 50%, impedance between the conductive surface of the substrate and the metal film is in a range of $1.0\times10^3$ to $1.0\times10^8\Omega$, when an AC voltage with an amplitude of 1 V and a frequency of 1.0 Hz is applied, the elastic layer comprises an insulating first phase comprising at least a crosslinked product of a first rubber, and a second phase comprising conductive particles and a crosslinked product of a second rubber different from the first rubber, a thickness of the elastic layer is at least 10 μm, the elastic layer has a matrix-domain structure in which domains composed of the second phase is dispersed in a matrix composed of the first phase in a region of at least 5 μm in a depth direction to the elastic layer from an interface between the elastic layer and the surface layer, a region having a thickness of 1 μm from an interface between the elastic layer and the surface layer to a position of 1 μm in a depth direction to the elastic layer is defined as a region A, and a region having a thickness of 1 μm from the interface to a position of 5 to 6 μm in a depth direction to the elastic layer is defined as a region B, when a first surface of the elastic layer in the region A is exposed and a square first observation region having a side of 100 μm is placed on the first surface by a scanning electron microscope, the first observation region comprises at least the second phase, a ratio value (AR12/AR11) of a total area AR12 of the second phase in the first observation region relative to an area AR11 of the first observation region is more than 0.40, and when a second surface of the elastic layer in the region B is exposed and a square second observation region having a side of 100 μm is placed on the second surface by a scanning electron microscope, the matrix-domain structure is observed in the second observation region, and a ratio value (AR22/AR21) of a total area AR22 of the second phase in the second observation region relative to an area AR21 of the second observation region is 0.40 or less.

2. The electrophotographic member according to claim 1, wherein the AR12/AR11 is 0.50 or more.

3. The electrophotographic member according to claim 1, wherein when an observation region of 15 μm square is placed on the second surface in the region B, a perimeter of the domain is defined as A, and an envelope perimeter of the domain is defined as B, a proportion of the domains having a value of A/B of 1.00 to 1.10 is 80 number % or more.

4. The electrophotographic member according to claim 1, wherein a ratio $S_c/S$ of a cross-sectional area $S_c$ of the conductive particle relative to a cross-sectional area S of the domain in the region B is 20.0 to 30.0%.

5. The electrophotographic member according to claim 1, wherein when $\rho_A$ denotes a volume resistivity of the region A, and $\rho_B$ denotes a volume resistivity of the region B, $\rho_B/\rho_A\geq10.0$ is satisfied.

6. The electrophotographic member according to claim 1, wherein a volume resistivity ρm of the matrix in the region B is $1.0\times10^8$ Ωcm or more and $1.0\times10^{17}$ Ωcm or less.

7. The electrophotographic member according to claim 1, wherein the surface layer comprises a binder resin and an electronic conductive agent dispersed in the binder resin, an outer surface of the surface layer has a protruded portion derived from an exposed portion of the electronic conductive agent, and universal hardness at a position of a depth of 1 μm from the outer surface of the surface layer is 1.0 to 7.0 $N/mm^2$.

8. The electrophotographic member according to claim 1, wherein the first rubber comprises at least one selected from a group consisting of isoprene rubber (IR), butadiene rubber (BR), styrene-butadiene rubber (SBR), and acrylonitrile butadiene rubber (NBR), and the second rubber comprises at least one selected from a group consisting of isoprene rubber (IR), butadiene rubber (BR), styrene-butadiene rubber (SBR), acrylonitrile butadiene rubber (NBR), and ethylene propylene diene rubber (EPDM).

9. The electrophotographic member according to claim 1, wherein an absolute value of a difference in solubility parameter (SP value) between the first rubber and the second rubber is 0.4 to 5.7 $(J/cm^3)^{0.5}$.

10. The electrophotographic member according to claim 9, wherein in a combination of the first rubber and the second rubber, the first rubber is NBR and the second rubber is SBR, the first rubber is SBR and the second rubber is NBR, the first rubber is NBR and the second rubber is EPDM, the first rubber is SBR and the second rubber is EPDM, the first rubber is NBR and the second rubber is IR, or the first rubber is BR and the second rubber is NBR.

11. The electrophotographic member according to claim 1, wherein the electrophotographic member is a charging member.

12. A process cartridge detachable from an electrophotographic image forming apparatus, the process cartridge comprising:

the electrophotographic member according to claim 1.

13. An electrophotographic image forming apparatus, comprising:

the electrophotographic member according to claim 1.

14. The electrophotographic image forming apparatus according to claim 13, wherein the electrophotographic image forming apparatus includes an electrophotographic photosensitive member and a charging member that charges the electrophotographic photosensitive member, and the charging member is the electrophotographic member.

* * * * *